(12) United States Patent
Suga

(10) Patent No.: US 6,295,155 B1
(45) Date of Patent: Sep. 25, 2001

(54) SPATIAL FREQUENCY CONVERTING DEVICE AND OPTICAL SYSTEM HAVING THE SAME

(75) Inventor: Takeshi Suga, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/401,990

(22) Filed: Sep. 23, 1999

(30) Foreign Application Priority Data

Sep. 28, 1998 (JP) .................................................. 10-272868

(51) Int. Cl.[7] .................................................. G02B 26/00
(52) U.S. Cl. .......................... 359/238; 359/251; 359/278; 359/279
(58) Field of Search .................................. 359/238, 251, 359/278, 279, 239, 242, 244

(56) References Cited

U.S. PATENT DOCUMENTS 5,444,574 * 8/1995 Ono et al. .............................. 359/708
5,781,236 * 7/1998 Shinbori et al. ....................... 348/342
6,078,380 * 6/2000 Taniguchi et al. ..................... 355/52

FOREIGN PATENT DOCUMENTS

96/24085    8/1996   (WO) .

* cited by examiner

Primary Examiner—Georgia Epps
Assistant Examiner—Timothy Thompson
(74) Attorney, Agent, or Firm—Pillsbury Winthrop LLP

(57) ABSTRACT

A spatial frequency converting device in which the amount of conversion of spatial frequency characteristics is variable. An optical system using the spatial frequency converting device is a variable-focus optical system in which the depth of field can be enlarged by fixed signal processing. A pupil modulation element provided in a fixed-focus optical system includes a plurality of elements. At least one of the elements is rotated about an optical axis. In the variable-focus optical system, a movable lens placed on the object side of a pupil modulation element is moved along an optical axis.

10 Claims, 21 Drawing Sheets

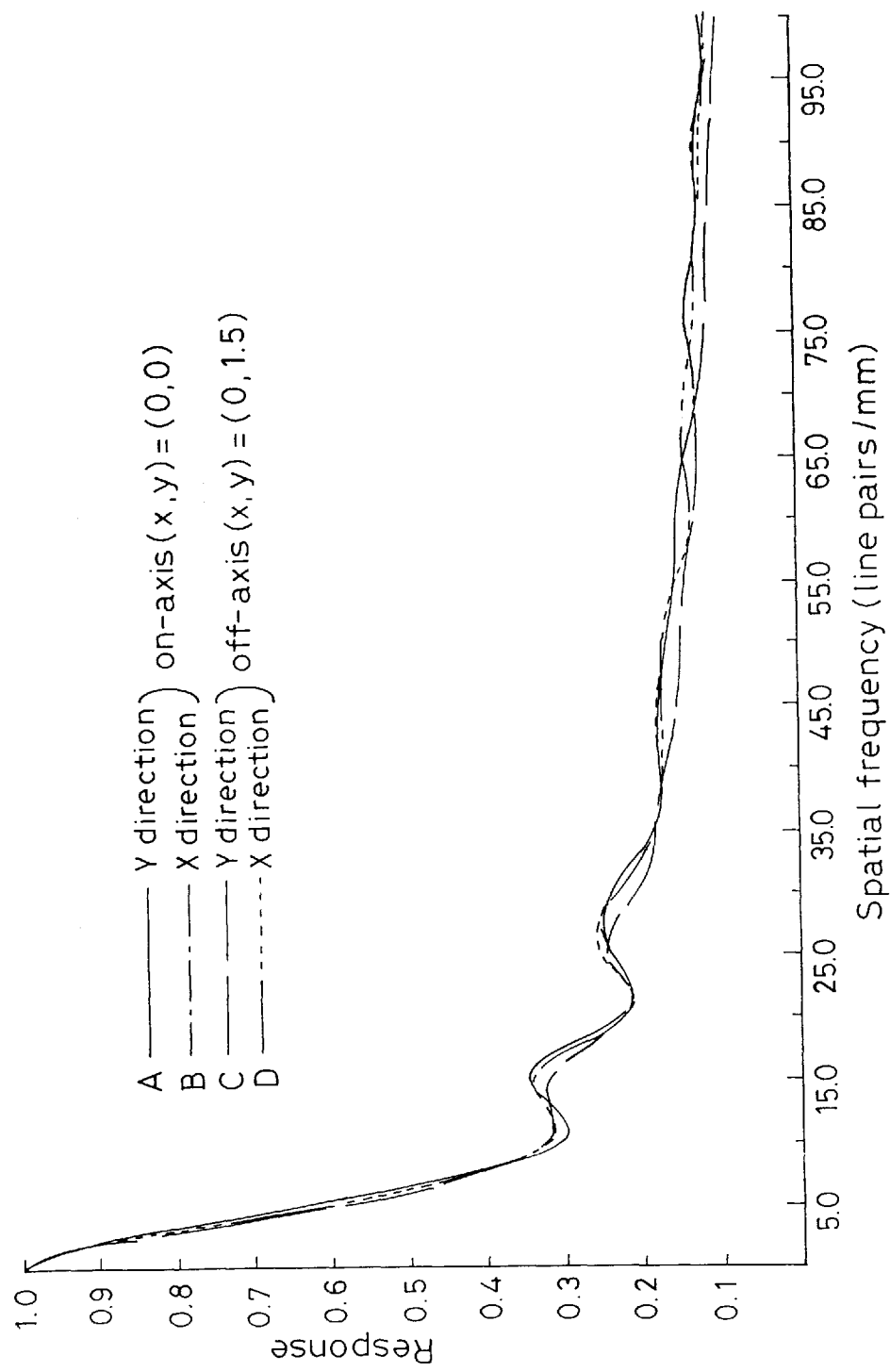

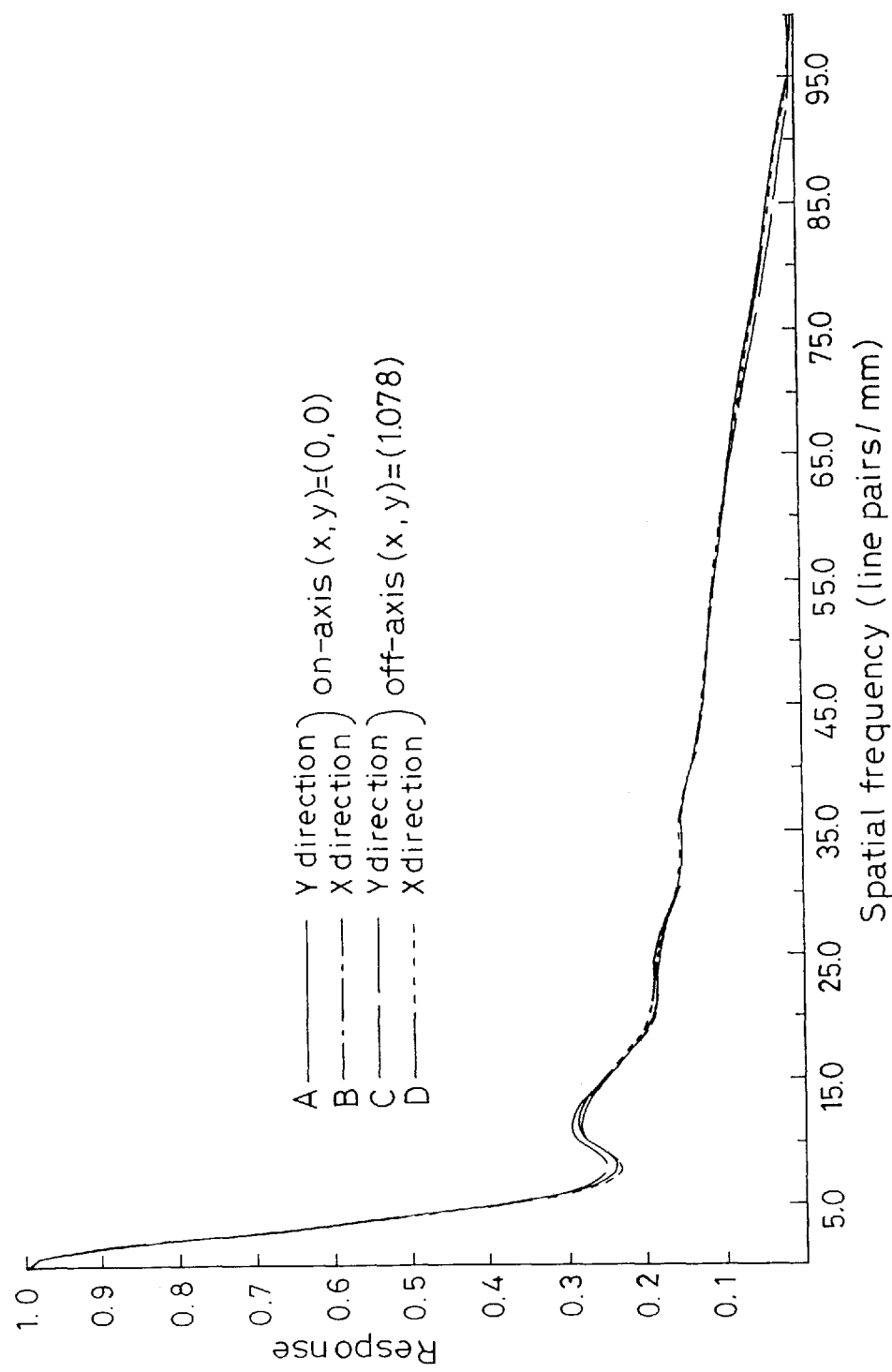

SPATIAL FREQUENCY CONVERTING DEVICE AND OPTICAL SYSTEM HAVING THE SAME

BACKGROUND OF THE INVENTION

1. Field of the Invention

The present invention relates to a spatial frequency converting device and an optical system having the same, for example, an optical system having a device for converting spatial frequency characteristics of the optical system, such as a pupil modulation element. More particularly, the present invention relates to fixed-focus optical systems having no focusing mechanism, such as endoscope optical systems, and variable-focus optical systems.

2. Description of Related Art

There has heretofore been known a technique of converting the spatial frequency characteristics of an optical system by using a pupil modulation element to enlarge the depth of field of the optical system, as disclosed, for example, in PCT/US96/01514. In such an optical system, the spatial frequency characteristics of the optical system are made constant over a wider range than the normal depth of field by the pupil modulation element. However, the use of a pupil modulation element gives rise to problems. That is, the spatial frequency response of the optical system lowers in the frequency range of from a high-frequency region to an intermediate-frequency region, and a phase shift is produced at each frequency.

In PCT/US96/01514, therefore, signal processing is executed to increase the spatial frequency response of the optical system in the frequency range of from a high-frequency region to an intermediate-frequency region and to correct the phase shift at each frequency.

Thus, because the spatial frequency characteristics of the optical system are constant over a wide depth of field, an image of high quality can be obtained over an enlarged depth of field by fixed signal processing irrespective of the distance to the subject.

FIG. 16 is a sectional view of an optical system according to the prior art. Lens data is shown in Table 1 (shown later). In FIG. 16, a pupil modulation element 1 as disclosed in PCT/US96/01514 is applied to a fixed-focus optical system.

The focal length of the optical system is 1.603 millimeters, and the F-number thereof is 4.4265.

The pupil modulation element 1 has a free-form surface on one side thereof (surface No. 6). The free-form surface has a configuration given by $z=-0.08(x^3+y^3)$. It should be noted that the optical axis is defined as a z-axis, and coordinate axes perpendicularly intersecting the z-axis are defined as x- and y-axes. The unit is millimeter. The aperture stop 2 (surface No. 7) is a square aperture, each side of which is 0.9 millimeters long. The directions of the sides of the aperture stop 2 are coincident with the x- and y-axis directions of the pupil modulation element 1.

FIGS. 18 to 20 show the results of calculation of the spatial frequency characteristics of the optical system shown in FIG. 16 on the optical axis [(x,y)=(0,0)] and at an image height of 1.5 millimeters [(x,y)=(0,1.5)] performed with simulation software Code-V (trade name). In FIGS. 18 to 20, curves A and B represent the spatial frequency characteristics in the y- and x-axis directions, respectively, on the optical axis, and curves C and D represent the spatial frequency characteristics in the y- and x-axis directions, respectively, at an image height of 1.5 millimeters. The x- and y-axis directions are set coincident with the coordinates of the pupil modulation element 1.

FIG. 18 shows the spatial frequency response of the optical system shown in FIG. 16 in a case where the subject distance is 7 millimeters. Phase components in this case are shown in Table 2 (shown later).

FIG. 19 shows the spatial frequency response of the optical system shown in FIG. 16 in a case where the subject distance is 13.5 millimeters. Phase components in this case are shown in Table 3 (shown later).

FIG. 20 shows the spatial frequency response of the optical system shown in FIG. 16 in a case where the subject distance is 25 millimeters. Phase components in this case are shown in Table 4 (shown later).

For comparison, an optical system that does not use a pupil modulation element is shown in the sectional view of FIG. 17. Lens data is shown in Table 1. It should be noted that the optical system shown in FIG. 17 uses a plane surface as the surface No. 6 of the optical system shown in FIG. 16.

FIG. 21 shows the spatial frequency response of the optical system shown in FIG. 17 in a case where the subject distance is 7 millimeters. Phase components in this case are shown in Table 5 (shown later).

FIG. 22 shows the spatial frequency response of the optical system shown in FIG. 17 in a case where the subject distance is 13.5 millimeters. Phase components in this case are shown in Table 6 (shown later).

FIG. 23 shows the spatial frequency response of the optical system shown in FIG. 17 in a case where the subject distance is 25 millimeters. Phase components in this case are shown in Table 7 (shown later).

It will be understood by comparing FIGS. 18 to 20 and Tables 2 to 4 that the spatial frequency characteristics of the optical system are approximately constant independently of the distance to the subject. In addition, the spatial frequency response does not reach zero.

Comparison of the FIGS. 21 to 23 and Tables 5 to 7 reveals that the spatial frequency characteristics change, depending on the distance to the subject. In FIGS. 21 and 23, the spatial frequency response reaches zero. Accordingly, in the ordinary optical system shown in FIG. 17, the depth of field is smaller than the region of from 7 millimeters to 25 millimeters.

Thus, the pupil modulation element 1 allows the spatial frequency characteristics to be constant over a wider range than the depth of field of the ordinary optical system.

The pupil modulation element according to the prior art is always in a state of performing spatial frequency characteristic conversion. Therefore, the depth of field is constant at all times and cannot be changed by the user. In addition, it is assumed that the pupil modulation element is used in a fixed-focus optical system. Therefore, in a variable-focus optical system, the amount of conversion of spatial frequency characteristics changes with changes in the focal length of the optical system. Accordingly, the depth of field cannot be enlarged with a fixed spatial frequency characteristic restoring device (signal processing).

SUMMARY OF THE INVENTION

In view of the above-described problems associated with the prior art, an object of the present invention is to provide a spatial frequency converting device in which the amount of conversion of spatial frequency characteristics is variable, and also provide an optical system using the spatial frequency converting device.

Another object of the present invention is to provide a variable-focus optical system in which the depth of field can be enlarged with a fixed spatial frequency characteristic restoring device (signal processing).

To attain the above-described objects, the present invention provides a spatial frequency converting device for converting spatial frequency characteristics of an optical system. The spatial frequency converting device is selectively actuatable to switch between a state of performing spatial frequency characteristic conversion and a state of not performing spatial frequency characteristic conversion.

It is desirable that the spatial frequency converting device of the above variable type should include a plurality of converting devices arranged such that the amount of conversion is varied by rotating at least one converting device about an optical axis.

For example, two pupil modulation elements are provided in symmetry with respect to an aperture stop, and one of the pupil modulation elements is rotated about the optical axis to bring the two pupil modulation elements into a position where the amounts of spatial frequency characteristic conversion effected by the two pupil modulation elements cancel each other. Thus, by rotating one pupil modulation element about the optical axis, the spatial frequency converting device can be selectively switched to a state of performing spatial frequency characteristic conversion or to a state of not performing spatial frequency characteristic conversion. In a case where spatial frequency characteristic conversion is performed, the spatial frequency characteristics degraded by the pupil modulation element are restored by a signal processing device (image processing device), and thus observation is performed with an enlarged depth of field. In a case where spatial frequency characteristic conversion is not performed, observation is made with the normal depth of field without using the signal processing device. Thus, it becomes possible to change over depths of field from one to another by using the spatial frequency converting device.

In addition, the present invention provides an optical system having a spatial frequency converting device for converting spatial frequency characteristics of the optical system. The optical system is a variable-focus optical system having an aperture stop of a fixed size.

The variable-focus optical system according to the present invention is desirably an optical system whose F-number is invariable regardless of changes in the focal length. If the F-number is invariable regardless of changes in the focal length, the amount of conversion effected by the spatial frequency converting device is constant. Consequently, it is possible to perform observation with an enlarged depth of field with a fixed signal processing device (image processing device) regardless of changes in the focal length. Accordingly, the signal processing device can be simplified, and costs can be reduced.

The variable-focus optical system whose F-number is invariable is desirably arranged to change the focal length of a lens or a lens unit situated on the object side of the aperture stop. For example, the lens or a part of the lens unit situated on the object side of the aperture stop may be moved along the optical axis to change the focal length. Alternatively, a variable-focus lens using a liquid crystal or the like may be placed on the object side of the aperture stop. The variable-focus optical system whose F-number is invariable may be an optical system in which the focal length of a lens or a lens unit situated on the image side of the aperture stop is changed, and the aperture stop and the spatial frequency converting device are moved along the optical axis according to the amount of change in the focal length. To change the focal length of the lens or the lens unit situated on the image side of the aperture stop, for example, the lens or the lens unit may be moved along the optical axis. Alternatively, a variable-focus lens using a liquid crystal or the like may be placed.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 is a diagram showing the spatial frequency response of the optical system in the state shown in part (a) of FIG. 1 in a case where the subject distance is 7 millimeters.

FIG. 14 is a diagram showing the spatial frequency response of the optical system in the state shown in part (a) of FIG. 13 in a case where the subject distance is 5.75 millimeters.

DESCRIPTION OF THE PREFERRED EMBODIMENTS

Embodiments of the spatial frequency converting device and optical system according to the present invention will be described below.

Figure 1A:
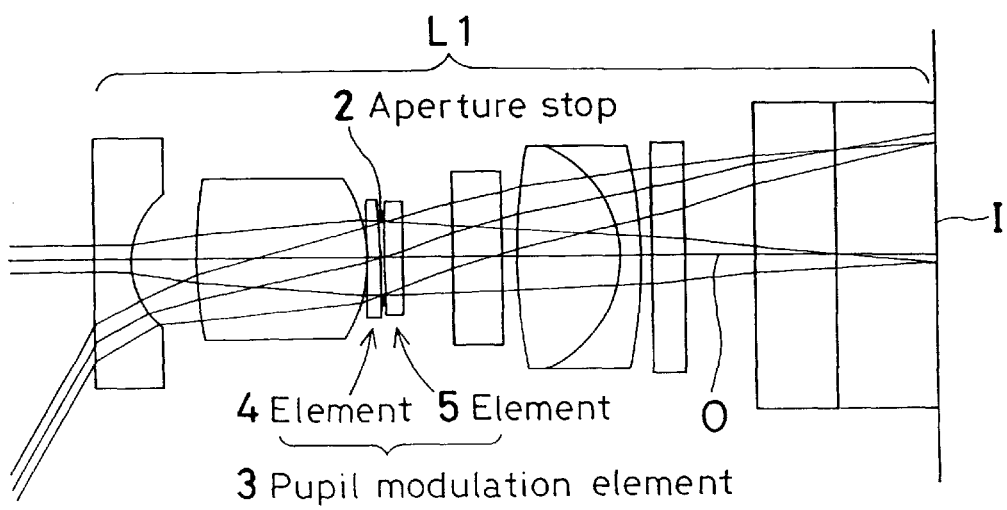
FIGS. 1a and b are sectional views showing two different states of an embodiment in which a pupil modulation element according to the present invention is applied to a fixed-focus optical system.
Figure 1B:
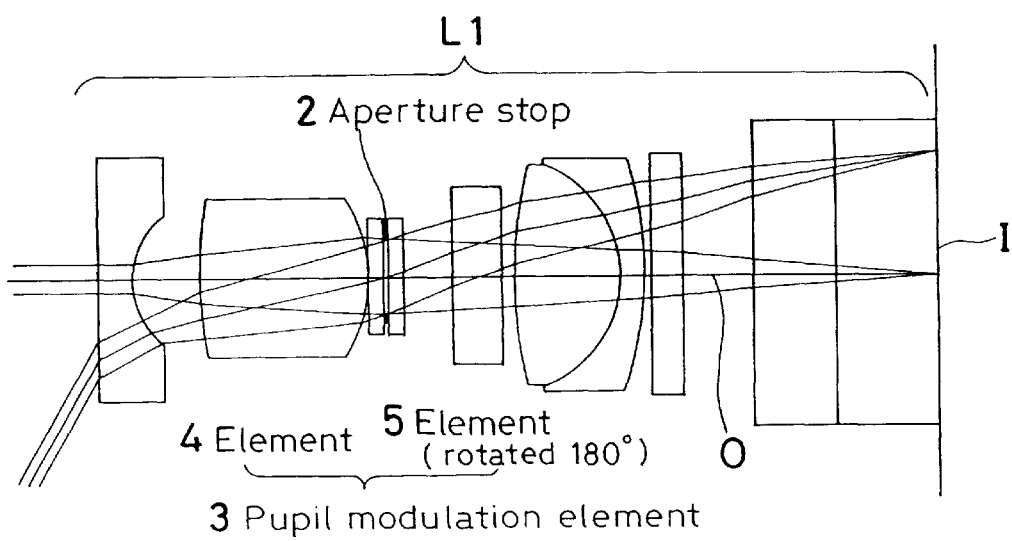

FIG. 1 is a sectional view of an embodiment in which a pupil modulation element 3 according to the present invention is applied to a fixed-focus optical system L1. Lens data concerning the fixed-focus optical system L1 is as shown in Table 1 (shown later). The pupil modulation element 3 according to the present invention includes two elements 4 and 5. The elements 4 and 5 are placed in symmetry with respect to an aperture stop 2 in the optical system L1. The element 5 is arranged to be rotatable about an optical axis O of the optical system L1. In the figure, reference character I denotes an image plane.

In part (a) of FIG. 1, a surface (surface No. 6) of the element 4 has a configuration given by $z=-0.04(x^3+y^3)$, and a surface (surface No. 8) of the element 5 has a configuration given by $z=0.04(x^3+y^3)$.

Part (b) of FIG. 1 shows the optical system L1 in a state where the element 5 has been rotated through 180 degrees about the optical axis O. Assuming that the x- and y-axes are fixed, the above-mentioned surface (surface No. 8) of the element 5 as placed in this position has a configuration given by $z=-0.04(x^3+y^3)$. It should be noted that the optical axis O is defined as a z-axis, and coordinate axes perpendicularly intersecting the z-axis are defined as x- and y-axes. The unit is millimeter.

FIGS. 2 to 7 show the results of calculation of the spatial frequency characteristics of the optical system L1 on the optical axis and at an image height of 1.5 millimeters performed with simulation software Code-V (trade name) for each of the states shown in parts (a) and (b) of FIG. 1. In FIGS. 2 to 7, curves A and B represent the spatial frequency characteristics in the y- and x-axis directions, respectively, on the optical axis, and curves C and D represent the spatial frequency characteristics in the y- and x-axis directions, respectively, at an image height of 1.5 millimeters. The x- and y-axis directions are set coincident with the coordinates of the pupil modulation element 3.

FIG. 2 shows the spatial frequency response of the optical system in the state shown in part (a) of FIG. 1 in a case where the subject distance is 7 millimeters. Phase components in this case are shown in Table 8 (shown later).

Figure 3:
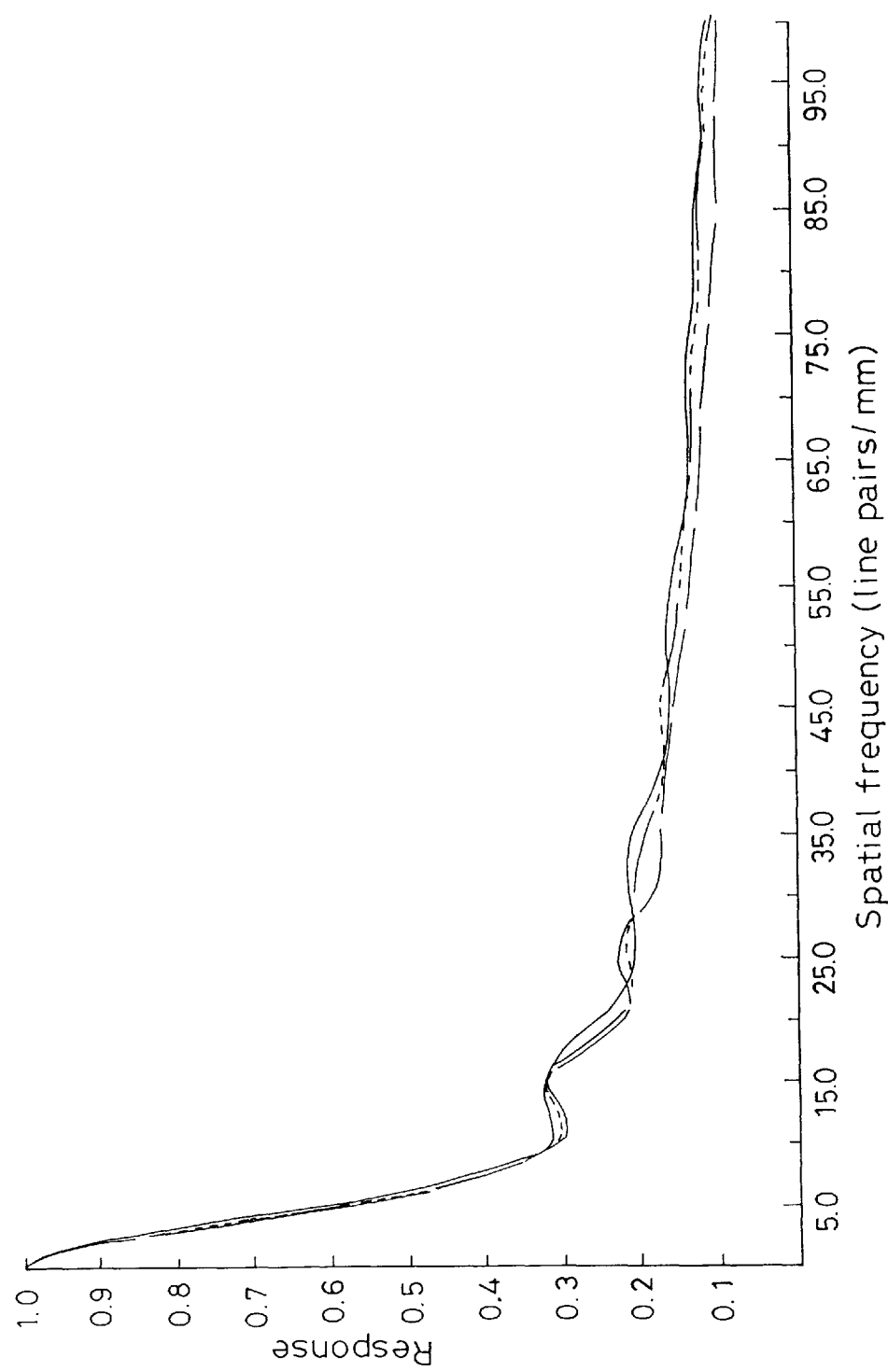
FIG. 3 is a diagram showing the spatial frequency response of the optical system in the state shown in part (a) of FIG. 1 in a case where the subject distance is 13.5 millimeters.

FIG. 3 shows the spatial frequency response of the optical system in the state shown in part (a) of FIG. 1 in a case where the subject distance is 13.5 millimeters. Phase components in this case are shown in Table 9 (shown later).

Figure 4:
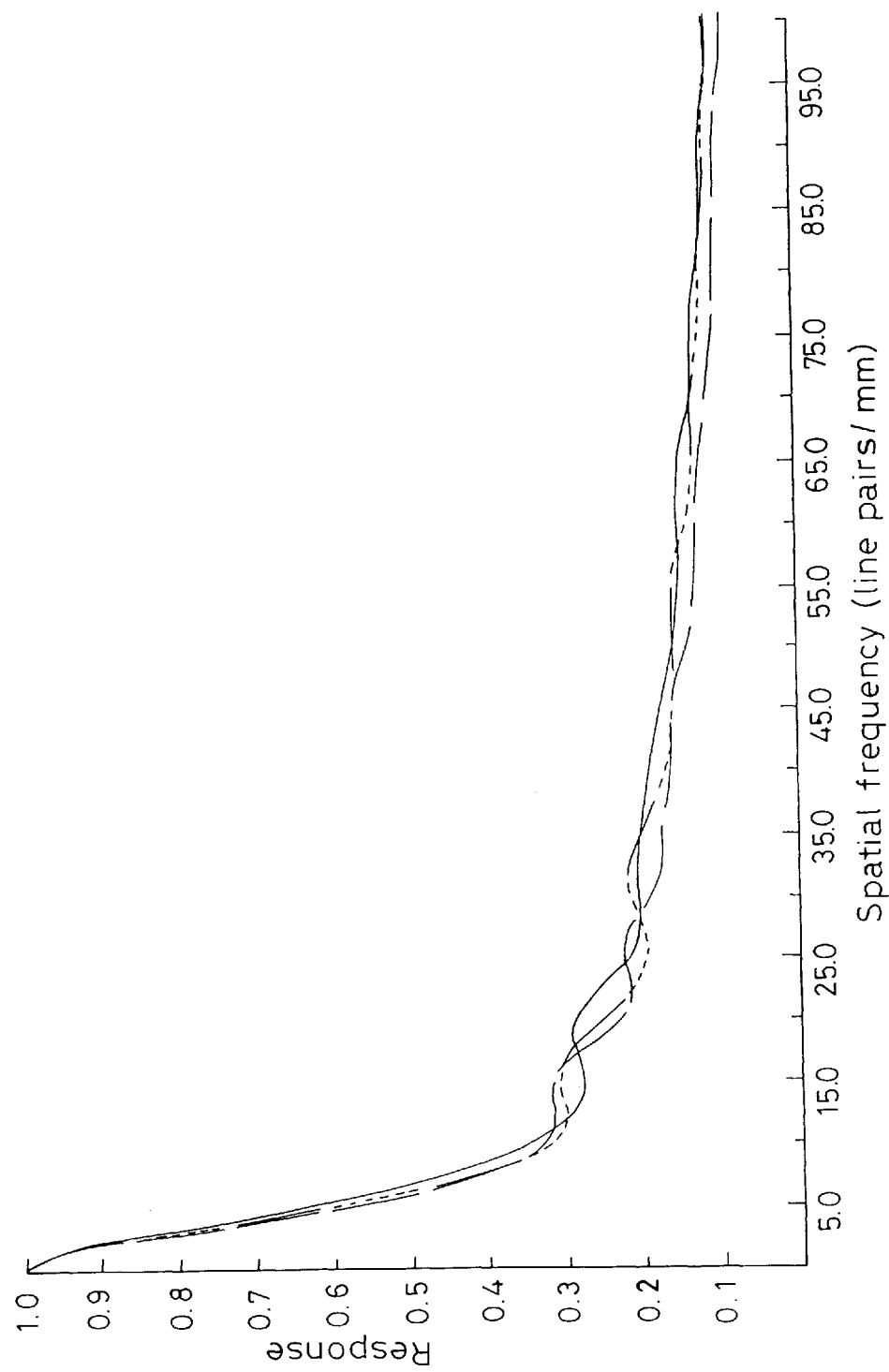
FIG. 4 is a diagram showing the spatial frequency response of the optical system in the state shown in part (a) of FIG. 1 in a case where the subject distance is 25 millimeters.

FIG. 4 shows the spatial frequency response of the optical system in the state shown in part (a) of FIG. 1 in a case where the subject distance is 25 millimeters. Phase components in this case are shown in Table 10 (shown later).

Figure 16:
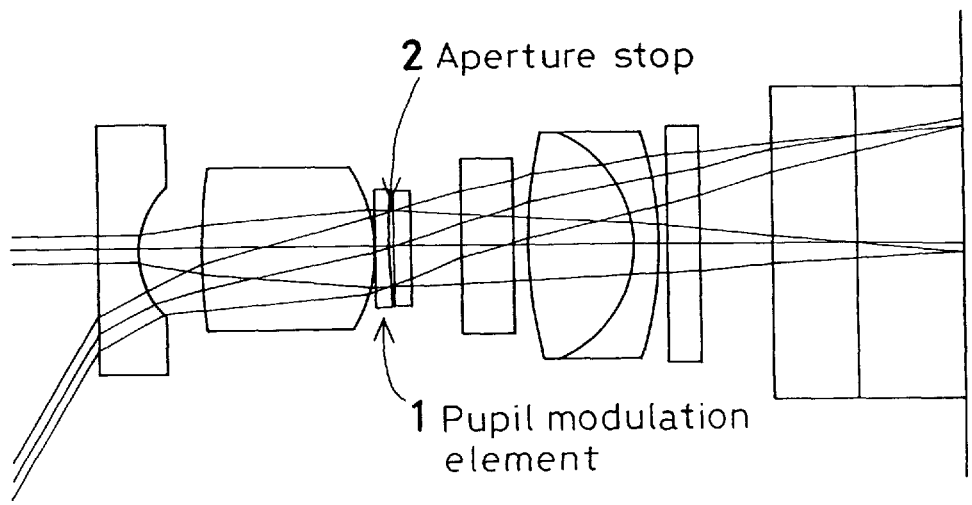
FIG. 16 is a sectional view of an optical system according to the prior art that uses a pupil modulation element.
Figure 18:
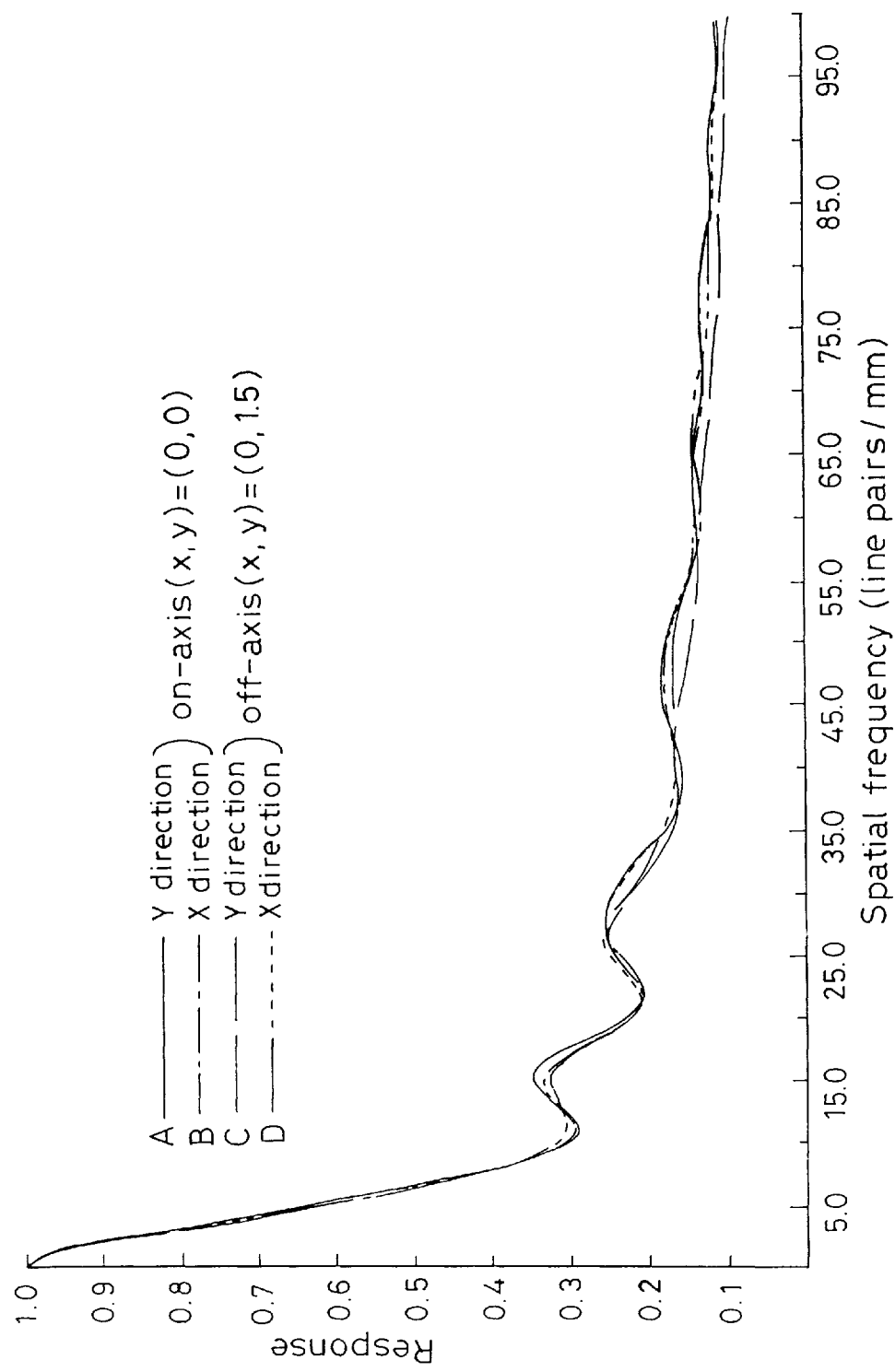
FIG. 18 is a diagram showing the spatial frequency response of the optical system shown in FIG. 16 in a case where the subject distance is 7 millimeters.
Figure 19:
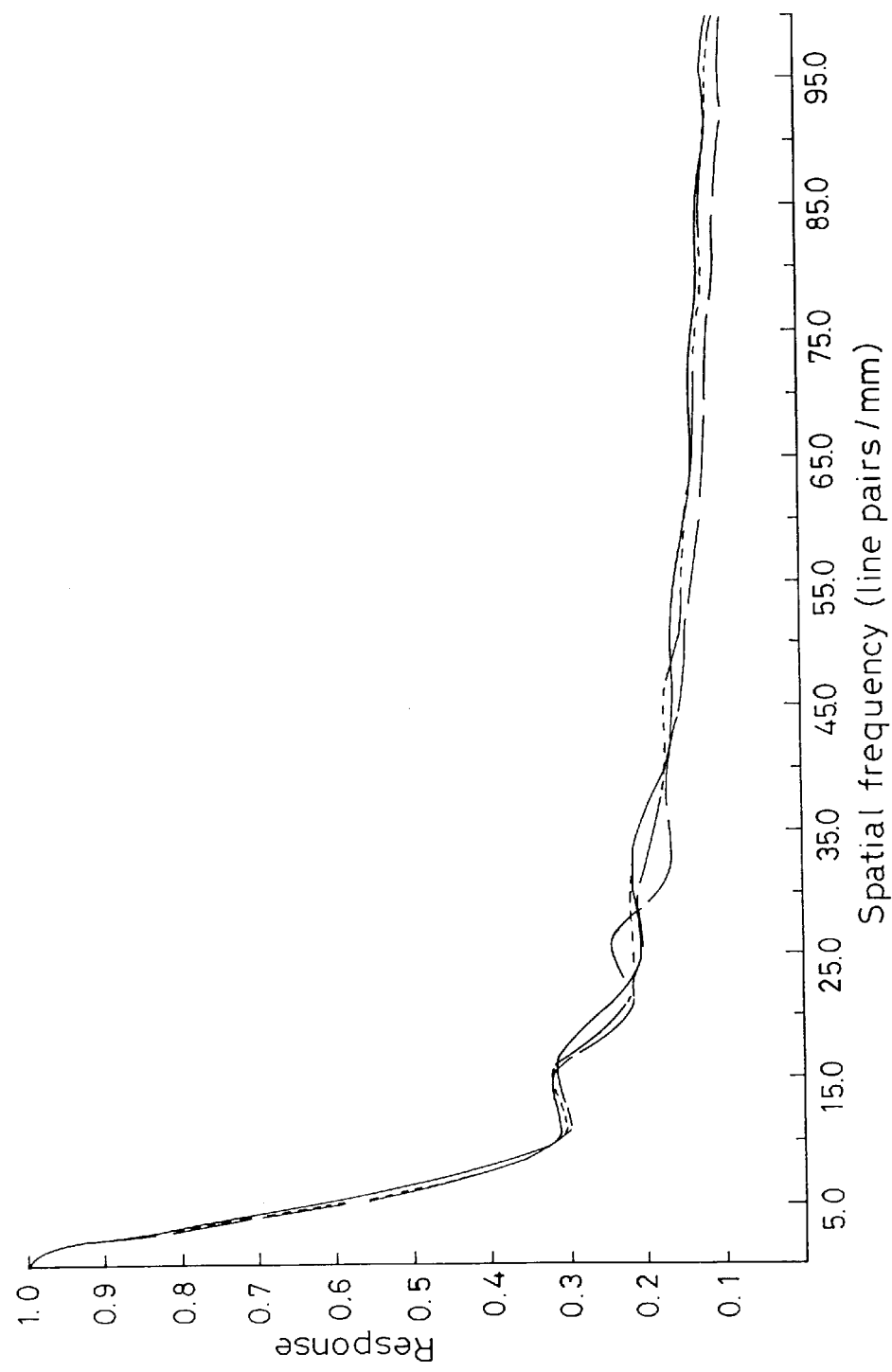
FIG. 19 is a diagram showing the spatial frequency response of the optical system shown in FIG. 16 in a case where the subject distance is 13.5 millimeters.
Figure 20:
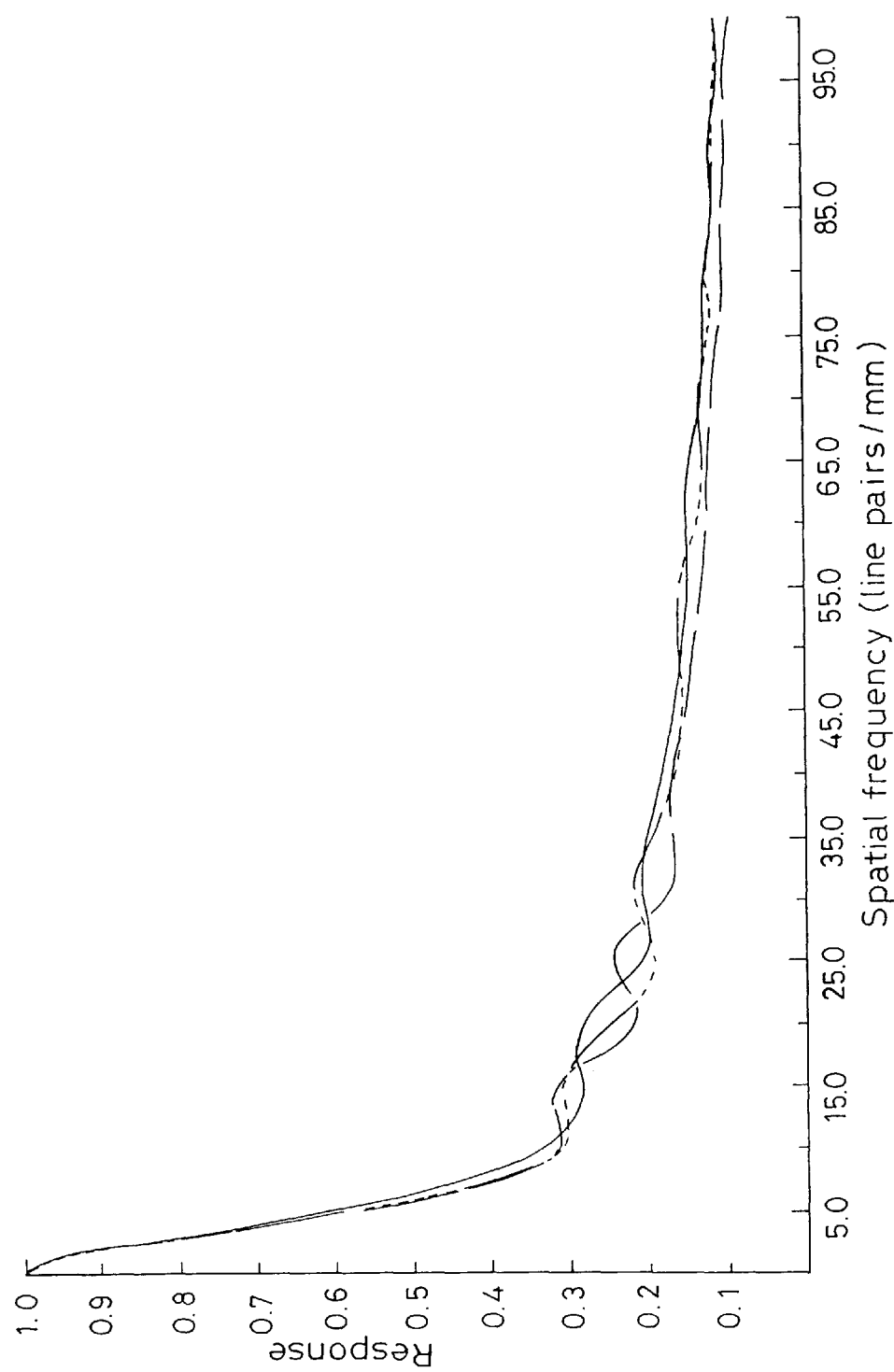
FIG. 20 is a diagram showing the spatial frequency response of the optical system shown in FIG. 16 in a case where the subject distance is 25 millimeters.

It will be understood by comparing FIGS. 2 to 4 with FIGS. 18 to 20 and Tables 8 to 10 with Tables 2 to 4 that the spatial frequency characteristics are approximately the same. Accordingly, in the state shown in part (a) of FIG. 1, the same effect as that of the conventional pupil modulation element 1 shown in FIG. 16 is obtained.

Figure 5:
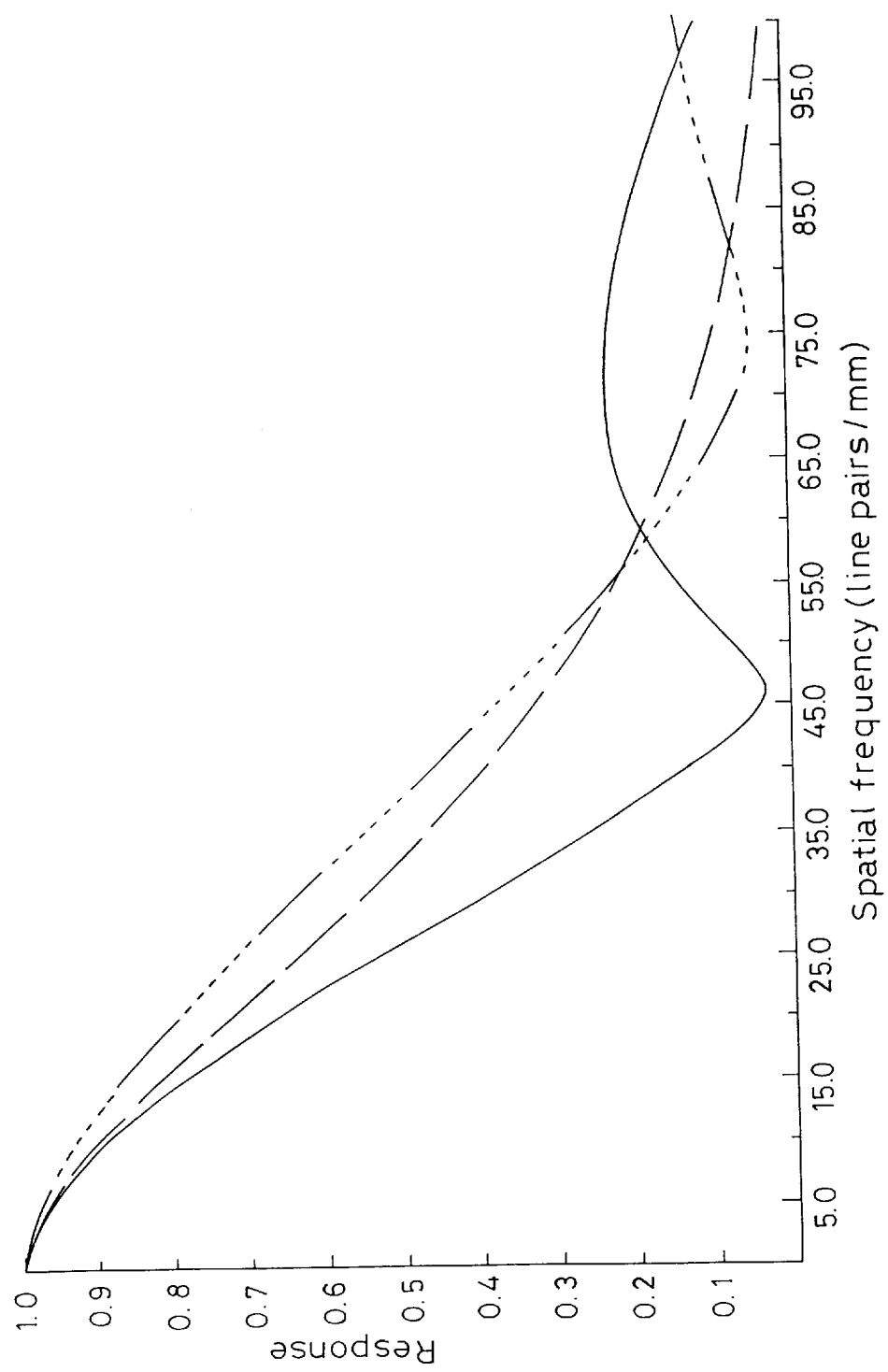
FIG. 5 is a diagram showing the spatial frequency response of the optical system in the state shown in part (b) of FIG. 1 in a case where the subject distance is 7 millimeters.

FIG. 5 shows the spatial frequency response of the optical system in the state shown in part (b) of FIG. 1 in a case where the subject distance is 7 millimeters. Phase components in this case are shown in Table 11 (shown later).

Figure 6:
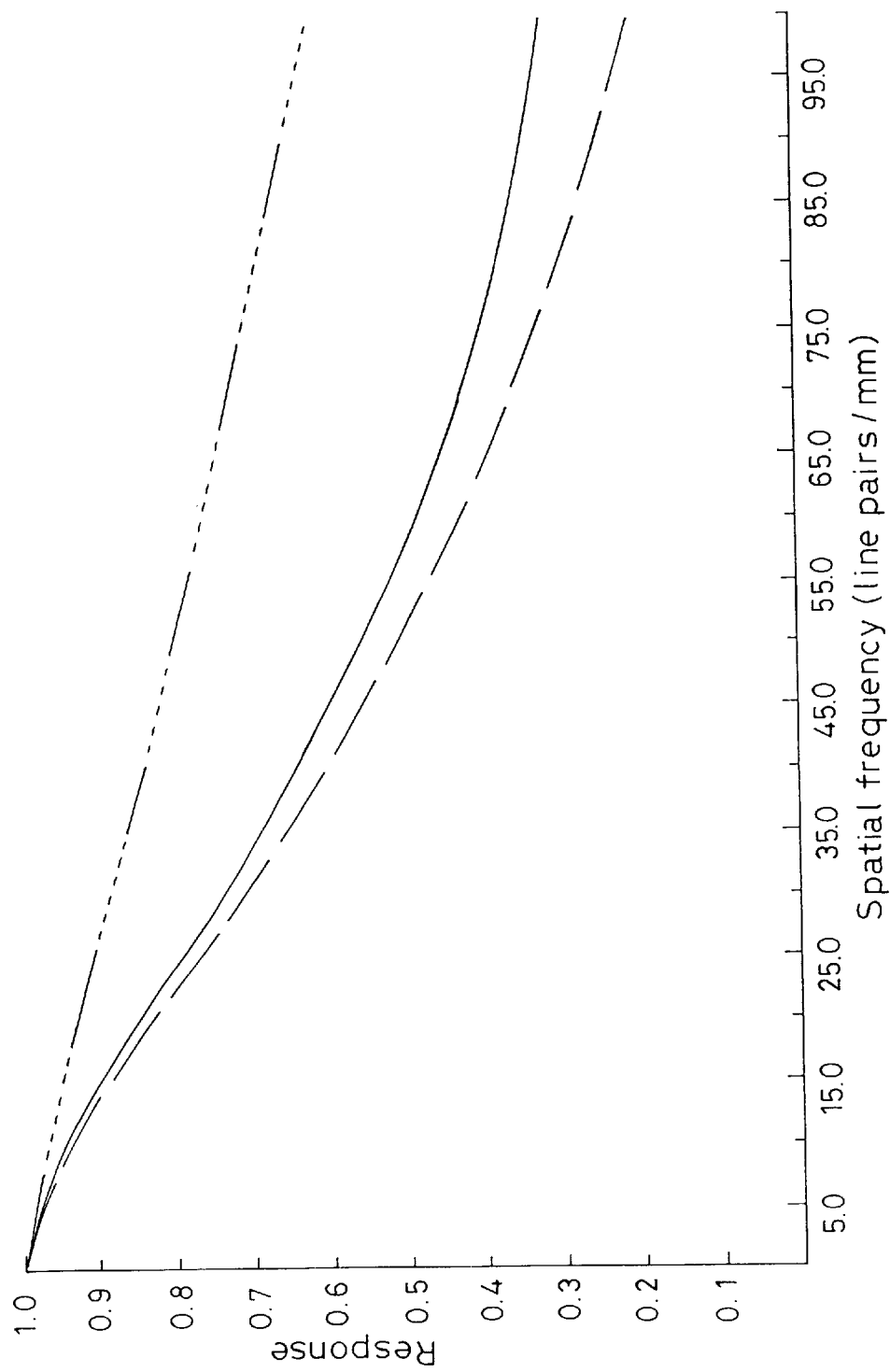
FIG. 6 is a diagram showing the spatial frequency response of the optical system in the state shown in part (b) of FIG. 1 in a case where the subject distance is 13.5 millimeters.

FIG. 6 shows the spatial frequency response of the optical system in the state shown in part (b) of FIG. 1 in a case where the subject distance is 13.5 millimeters. Phase components in this case are shown in Table 12 (shown later).

Figure 7:
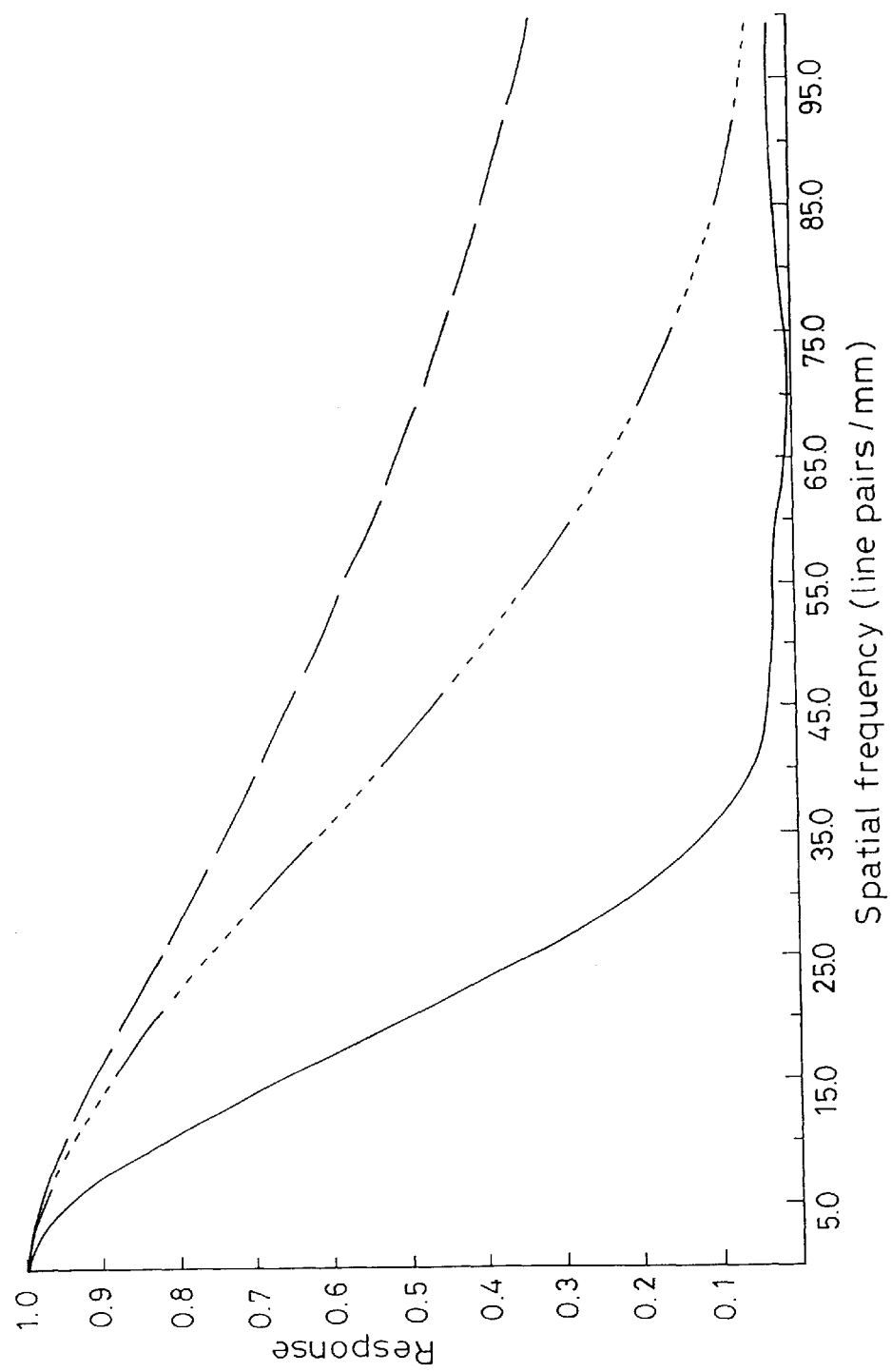
FIG. 7 is a diagram showing the spatial frequency response of the optical system in the state shown in part (b) of FIG. 1 in a case where the subject distance is 25 millimeters.

FIG. 7 shows the spatial frequency response of the optical system in the state shown in part (b) of FIG. 1 in a case where the subject distance is 25 millimeters. Phase components in this case are shown in Table 13 (shown later).

Figure 17:
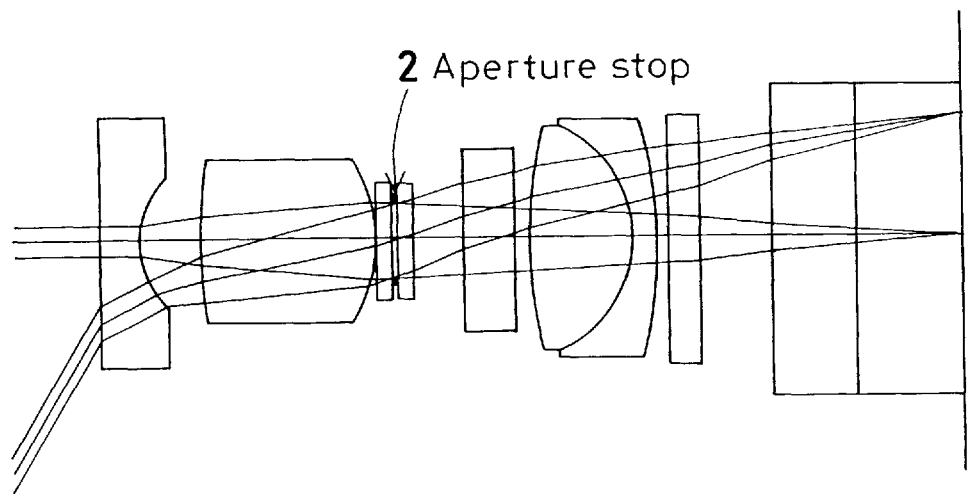
FIG. 17 is a sectional view of the optical system shown in FIG. 16 in a case where a pupil modulation element is not used.
Figure 21:
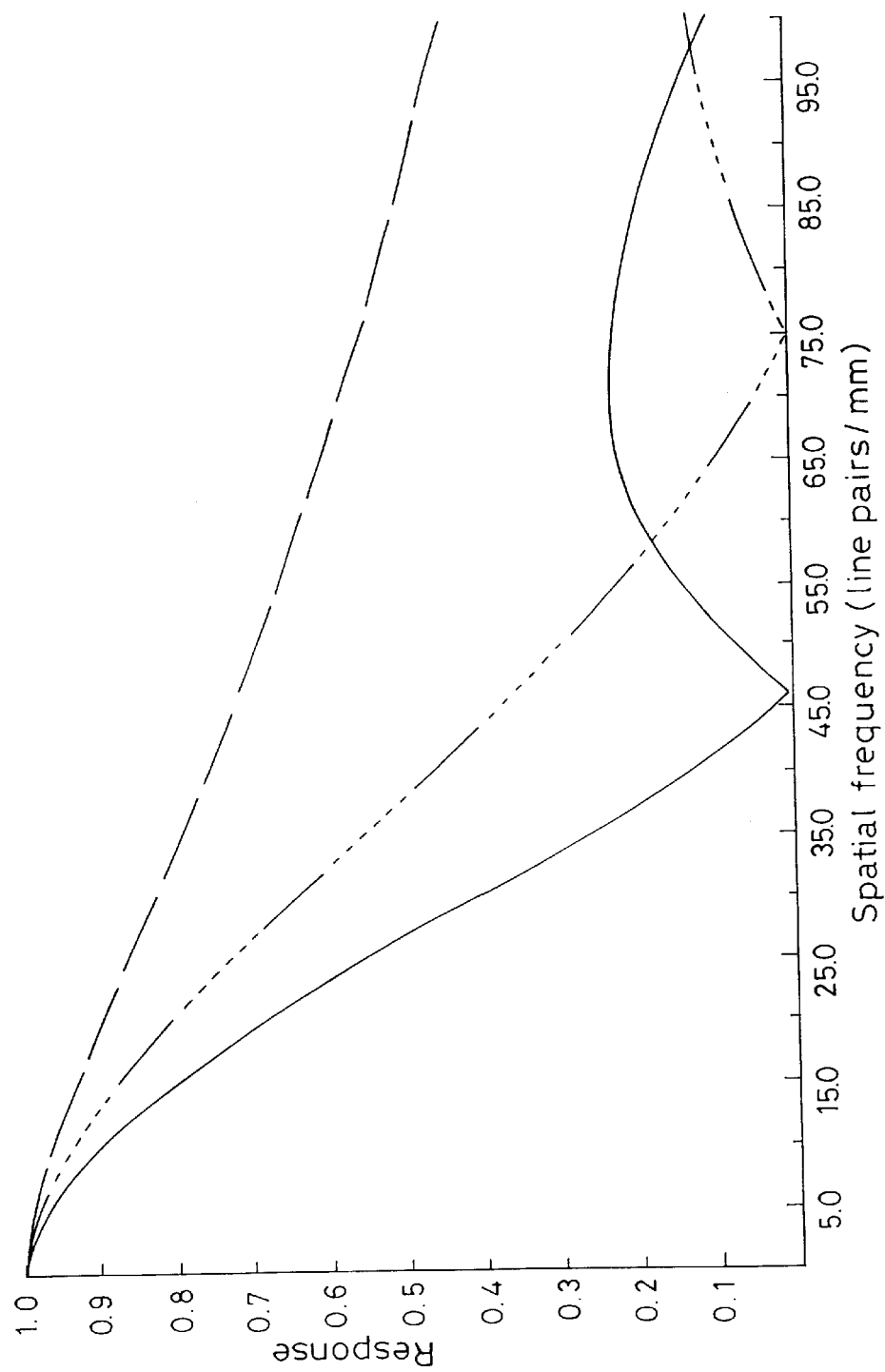
FIG. 21 is a diagram showing the spatial frequency response of the optical system shown in FIG. 17 in a case where the subject distance is 7 millimeters.
Figure 22:
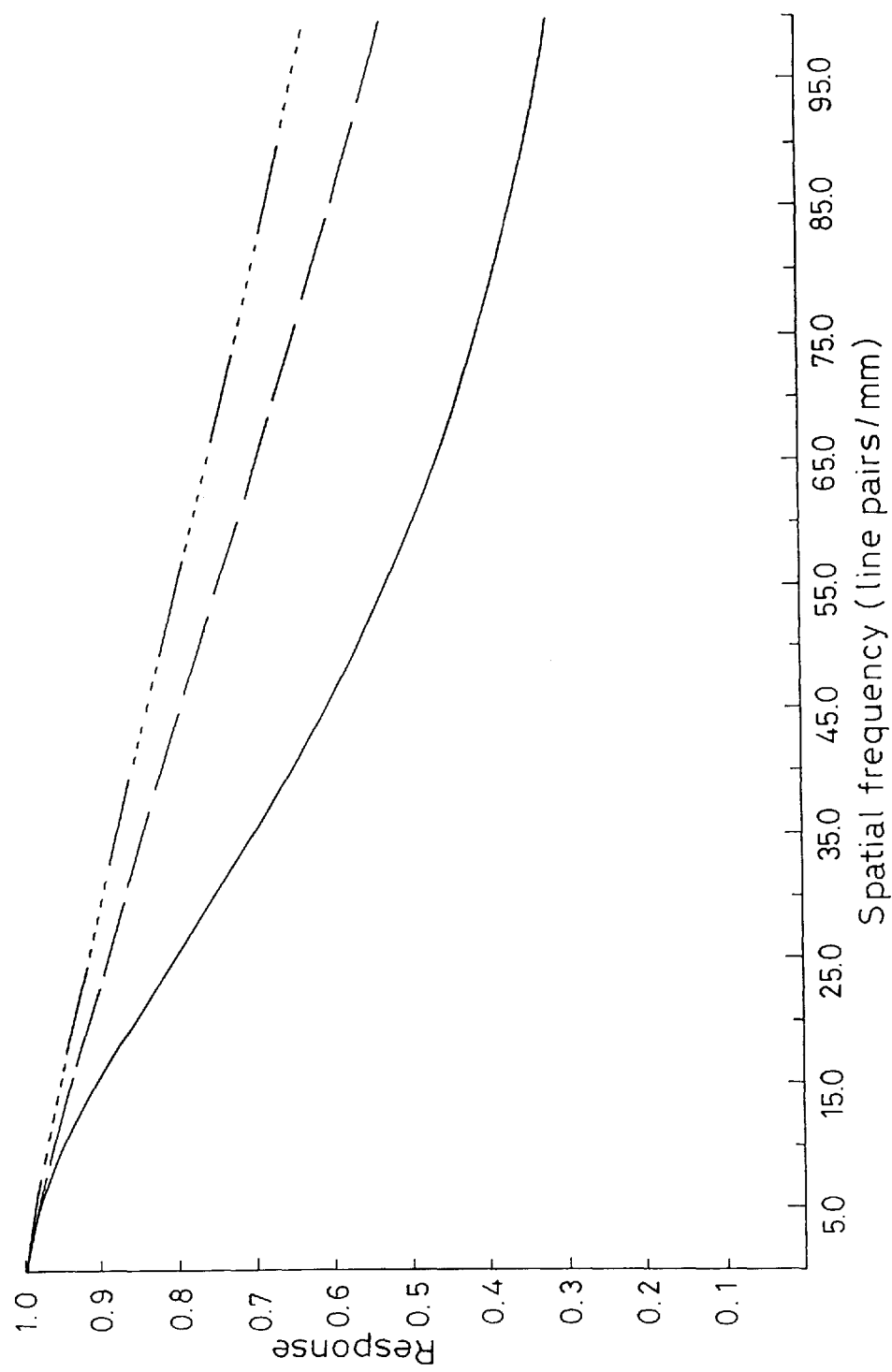
FIG. 22 is a diagram showing the spatial frequency response of the optical system shown in FIG. 17 in a case where the subject distance is 13.5 millimeters.
Figure 23:
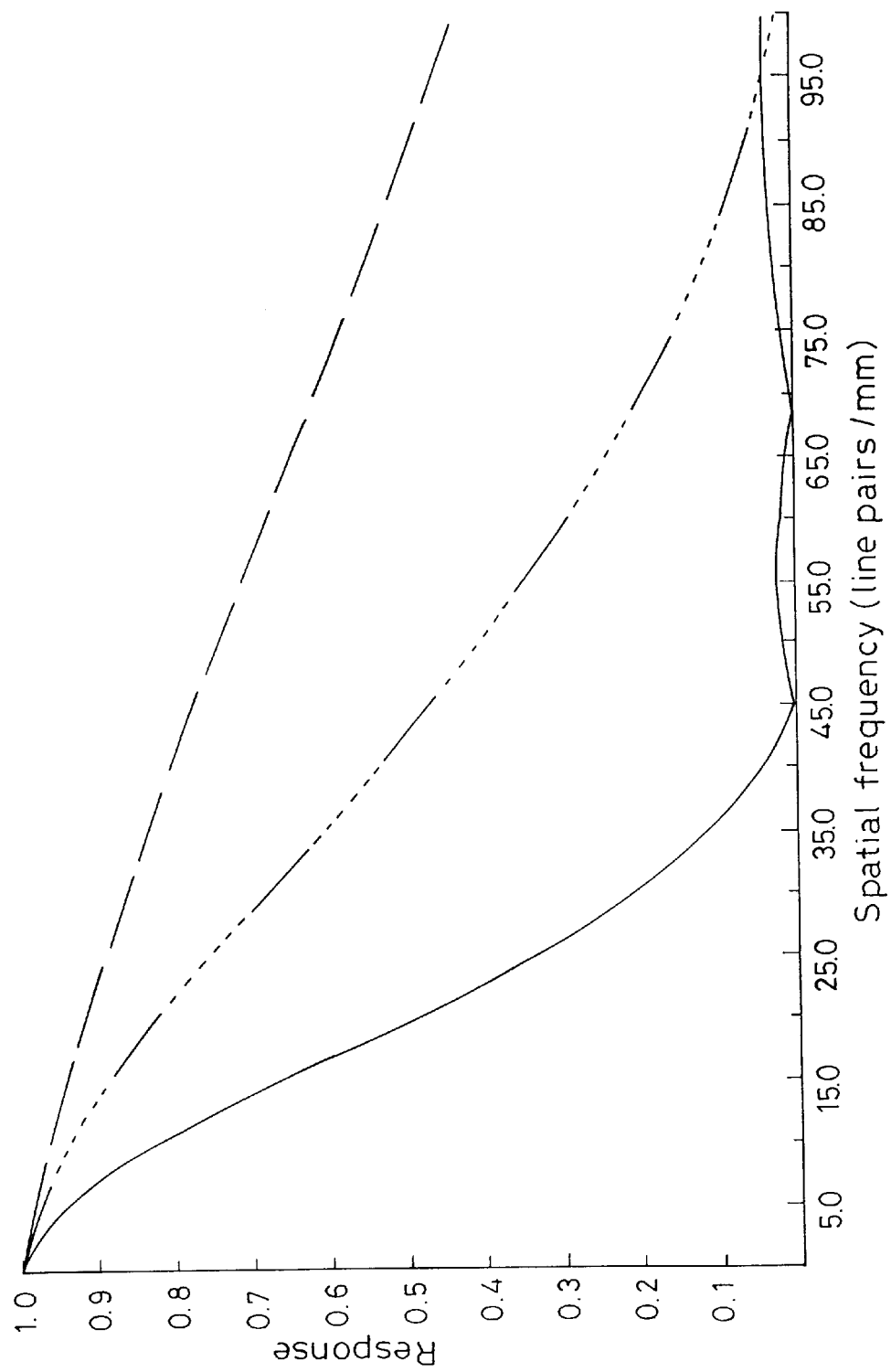
FIG. 23 is a diagram showing the spatial frequency response of the optical system shown in FIG. 17 in a case where the subject distance is 25 millimeters.

It will be understood by comparing FIGS. 5 to 7 with FIGS. 21 to 23 and Tables 11 to 13 with Tables 5 to 7 that the spatial frequency characteristics are approximately the same. Accordingly, in the state shown in part (b) of FIG. 1, the same effect as that in the case of the optical system that does not use a pupil modulation element, which is shown in FIG. 17, is obtained.

As has been stated above, the pupil modulation element 3 according to this embodiment makes it possible to switch between a state of performing spatial frequency characteristic conversion and a state of not performing spatial frequency characteristic conversion. In other words, it is possible to switch between a state where the optical system has the conventional pupil modulation element and a state where the optical system does not have such a pupil modulation element. Accordingly, it becomes possible to change over depths of field from one to another. In addition, because the arrangement does not involve selectively inserting a pupil modulation element into the optical path or withdrawing it from the optical path, the optical system can be constructed in a compact structure.

Figure 8A:
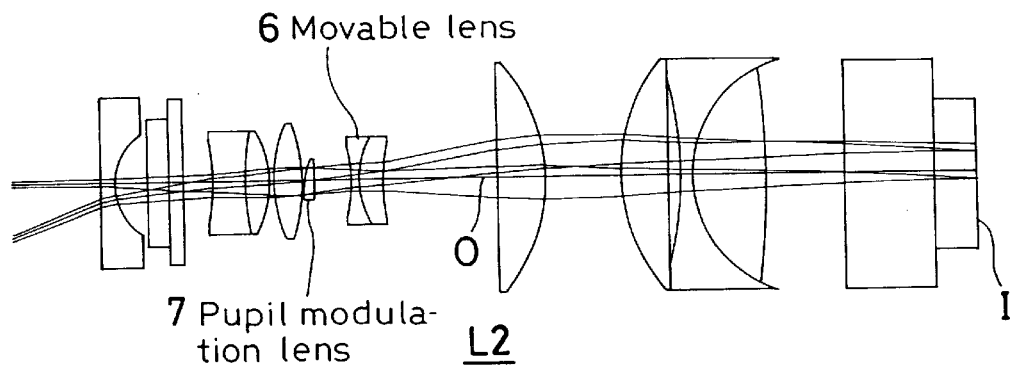
FIGS. 8a and b are sectional views showing two different states of an example of a variable-focus optical system having a fixed pupil modulation element.
Figure 8B:
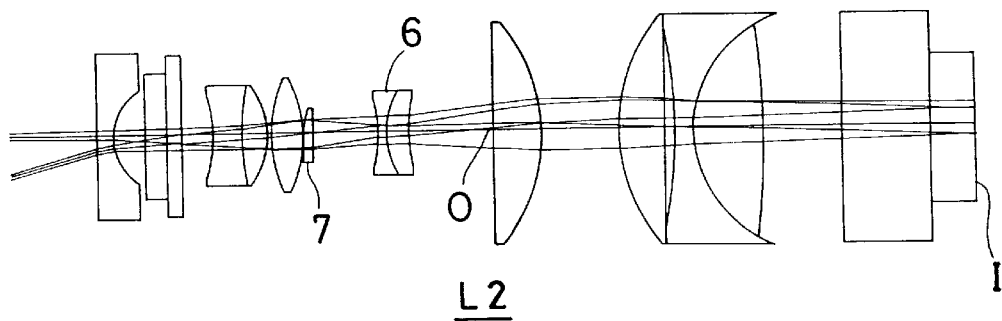

Next, an example in which a pupil modulation element is used in a variable-focus optical system L2 will be described. Parts (a) and (b) of FIG. 8 show the way in which F-number changes in accordance with a change in the focal length of the variable-focus optical system L2. In this case, a pupil modulation element 7 is immovable independently of the movement of a movable lens 6 in the optical system L2. Lens data concerning the variable-focus optical system L2 is shown in Table 14 (shown later).

Part (b) of FIG. 8 shows a state where the movable lens 6 has been moved toward the image plane I along the optical axis O by 0.8776 millimeters from the position shown in part (a) of FIG. 8.

In the state shown in part (a) of FIG. 8, the optical system L2 has a focal length of 2.2467 millimeters. In this state, the best subject distance is 15.6138 millimeters, and F-number is 9.2645.

In the state shown in part (b) of FIG. 8, the optical system L2 has a focal length of 2.8306 millimeters. In this state, the best subject distance is 8.2729 millimeters, and F-number is 11.7298.

The pupil modulation element 7 has a free-form surface on one side thereof (surface No. 12). The free-form surface has a configuration given by $z=0.1(x^3+y^3)$.

An aperture stop is placed on the curved surface (surface No. 12) of the pupil modulation element 7. The aperture stop is a square aperture, each side of which is 0.78 millimeters long. The directions of the sides of the aperture stop are set coincident with the x- and y-axis directions of the pupil modulation element 7.

Figure 10:
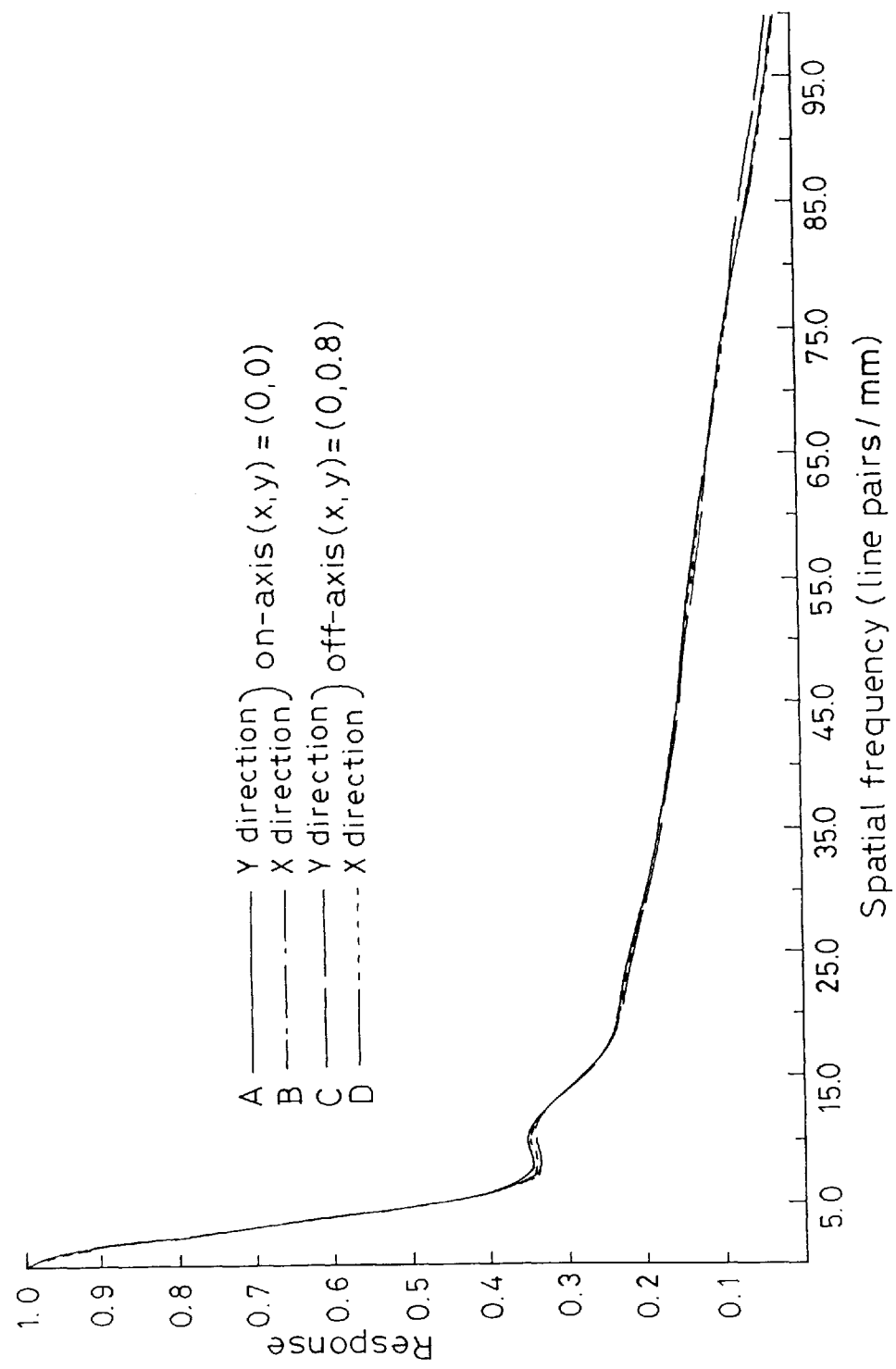
FIG. 10 is a diagram showing the spatial frequency response of the optical system in the state shown in part (a) of FIG. 8 in a case where the subject distance is 15.6138 millimeters.
Figure 11:
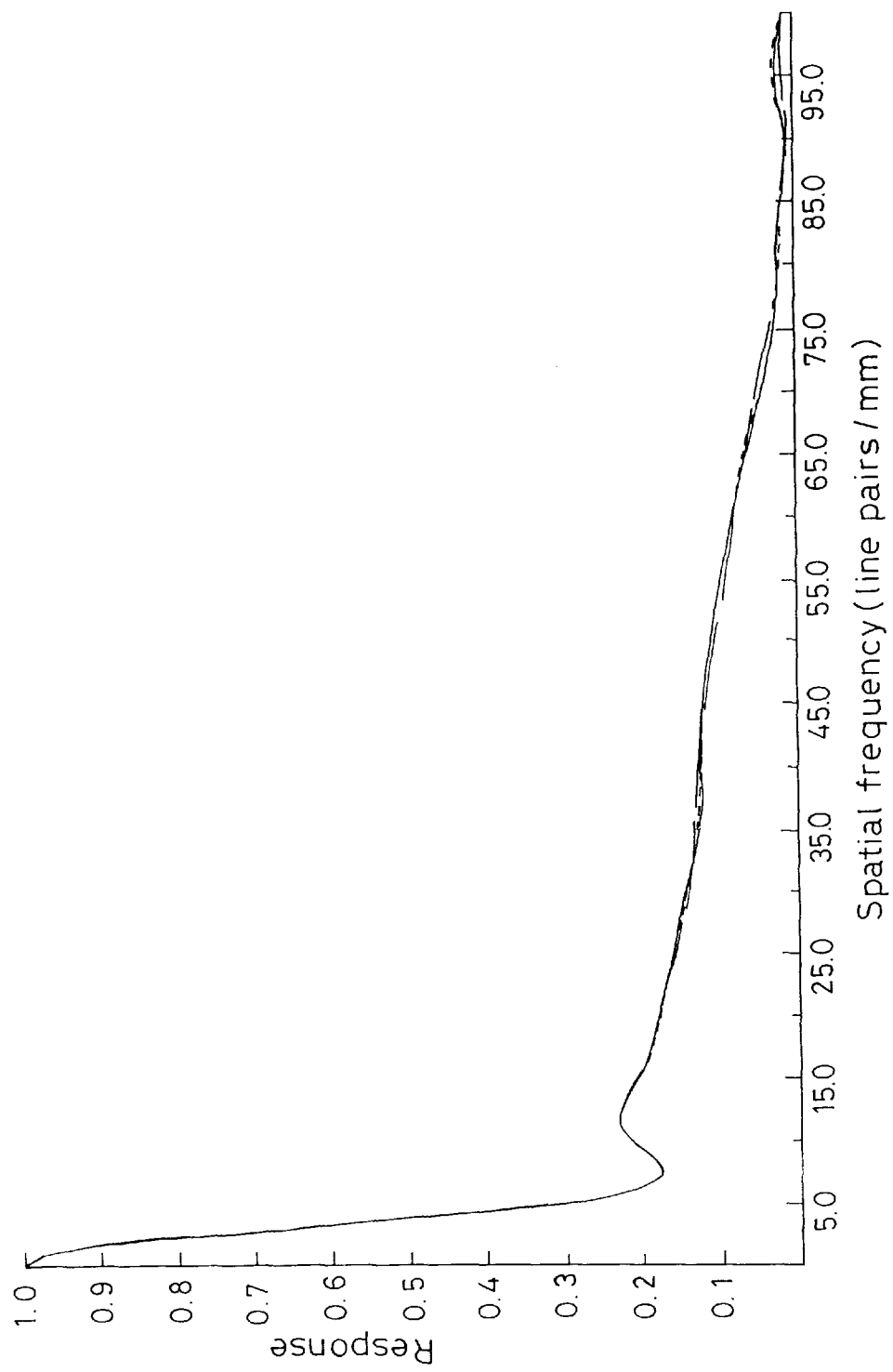
FIG. 11 is a diagram showing the spatial frequency response of the optical system in the state shown in part (b) of FIG. 8 in a case where the subject distance is 8.2729 millimeters.

FIGS. 10 and 11 show the results of calculation of the spatial frequency characteristics of the optical system on the optical axis $[(x,y)=(0,0)]$ and at an image height of 0.8 millimeters $[(x,y)=(0,0.8)]$ for each of the states shown in parts (a) and (b) of FIG. 8. In FIGS. 10 and 11, curves A and B represent the spatial frequency characteristics in the y- and x-axis directions, respectively, on the optical axis, and curves C and D represent the spatial frequency characteristics in the y- and x-axis directions, respectively, at an image height of 0.8 millimeters.

FIG. 10 shows the spatial frequency response of the optical system in the state shown in part (a) of FIG. 8 in a case where the subject distance is 15.6138 millimeters. Phase components in this case are shown in Table 15 (shown later).

FIG. 11 shows the spatial frequency response of the optical system in the state shown in part (b) of FIG. 8 in a case where the subject distance is 8.2729 millimeters. Phase components in this case are shown in Table 16 (shown later).

It will be understood by comparing FIGS. 10 and 11 and Tables 15 and 16 that the spatial frequency characteristics of the optical system change depending on the focal length of the optical system. In particular, there are large changes in the phase shift. The reason for this is as follows. As the focal length changes, the F-number of the optical system changes, and thus the spatial frequency characteristics of the optical system change. Consequently, the amount of modulation produced by the pupil modulation element 7 also changes. Therefore, it is difficult in the variable-focus optical system L2 to restore spatial frequency characteristics with a fixed signal processing device.

In such a case, a device for obtaining the focal length of the optical system L2 from the amount of movement of the movable lens 6 is provided, and signal processing devices are switched over from one to another on the basis of information about the focal length. By doing so, it becomes possible to enlarge the depth of field at each focal length. In an ordinary optical system such as that described above, F-number increases as the focal length increases. Accordingly, when the focal length is long, it is possible to obtain a depth-of-field enlarging effect resulting from an increase in F-number and also a depth-of-field enlarging effect produced by the pupil modulation element 7. However, a device for obtaining the focal length of the optical system L2 is needed, and the signal processing device becomes complicated, resulting in a rise in cost.

Figure 9:
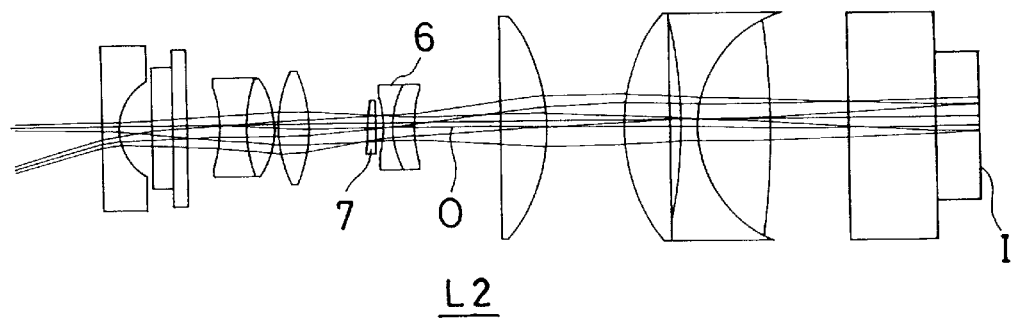
FIG. 9 is a sectional view showing a first embodiment of the variable-focus optical system according to the present invention in a state reached by moving optical elements with respect to their positions shown in part (a) of FIG. 8.

FIG. 9 shows a variable-focus optical system L2 according to the present invention in which F-number is made invariable. FIG. 9 shows a state where the position of the movable lens 6 is the same as in part (b) of FIG. 8, but the movable lens 6 has been moved toward the image plane I along the optical axis O by 0.8776 millimeters from the position shown in part (a) of FIG. 8. In this case, the aperture stop and the pupil modulation element 7 have also been moved toward the image plane I along the optical axis O by 1.8 millimeters from the position shown in part (a) of FIG. 8.

The optical system L2 shown in FIG. 9 has a focal length of 2.8306 millimeters. The best subject distance is 8.2729 millimeters, and F-number is 9.2628. In comparison with the state shown in part (a) of FIG. 8, it will be understood that there is no change in F-number in the optical system L2, although there is a change in the focal length.

Figure 12:
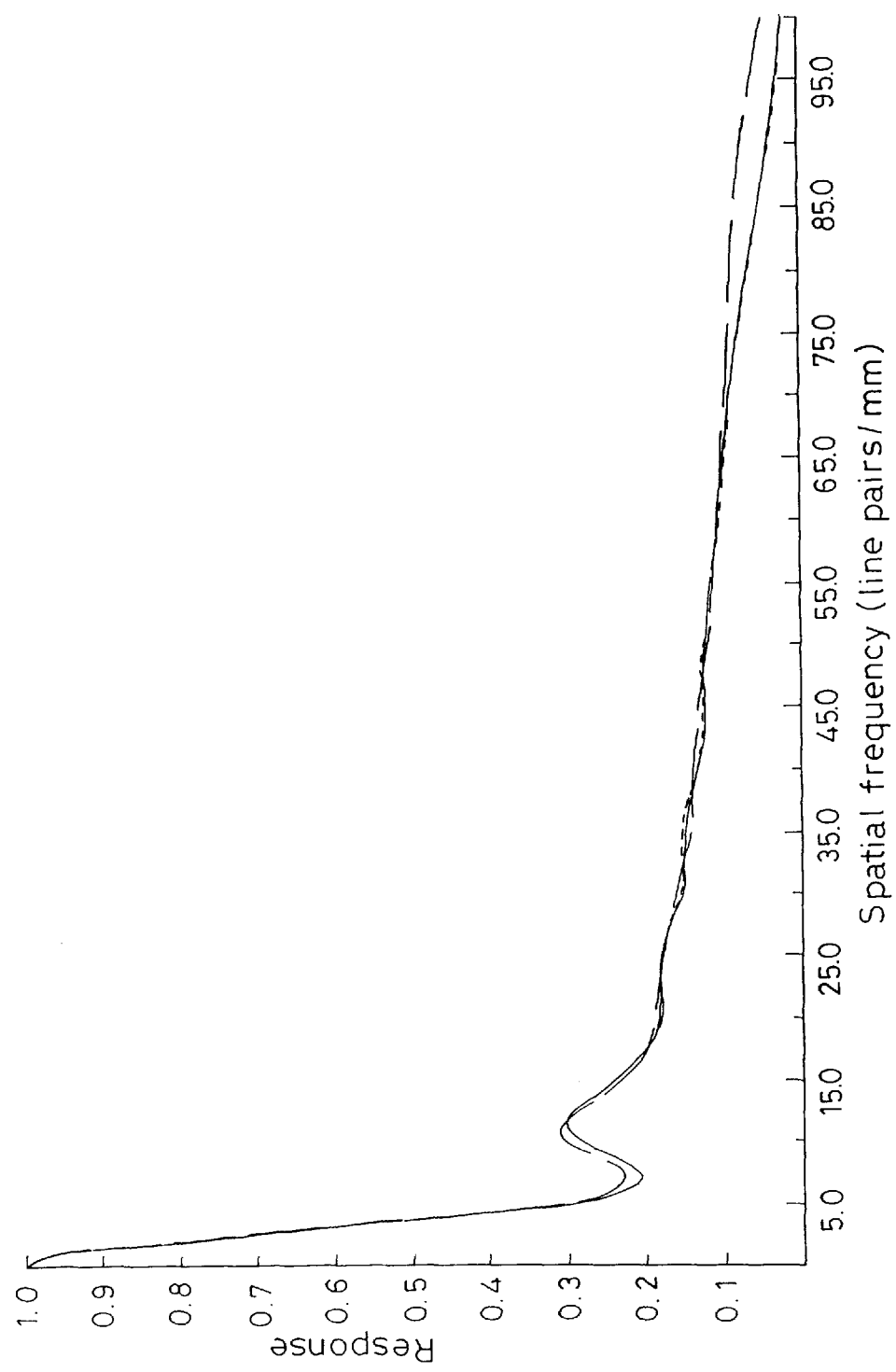
FIG. 12 is a diagram showing the spatial frequency response of the optical system shown in FIG. 9 in a case where the subject distance is 8.2729 millimeters.

FIG. 12 shows the spatial frequency response of the optical system shown in FIG. 9 in a case where the subject distance is 8.2729 millimeters. Phase components in this case are shown in Table 17 (shown later). It should be noted that curves A to D in FIG. 12 are the same as those in FIGS. 10 and 11.

It will be understood by comparing FIGS. 12 and 10 and Tables 17 and 15 that the spatial frequency characteristics are approximately constant. That is, the F-number of the optical system is kept unchanged regardless of the change in the focal length by moving the movable lens 6 toward the image plane I by 0.8776 millimeters and also moving the aperture stop and the pupil modulation element 7 toward the image plane I by 1.8 millimeters from their respective positions shown in part (a) of FIG. 8. Consequently, the amount of modulation produced by the pupil modulation element 7 is also kept constant.

The spatial frequency characteristics of the optical system L2 are determined by the F-number of the optical system and the pupil modulation element 7. The F-number of the optical system is determined by the ratio of the diameter of the exit pupil to the distance from the image plane I to the exit pupil position. The exit pupil is the image of the aperture stop formed by a lens situated on the image side of the aperture stop. Accordingly, even when the focal length of the lens on the image side of the aperture stop changes, the ratio of the exit pupil diameter to the distance from the image plane I to the exit pupil position can be made constant by optimizing the position of the aperture stop. For example, the position of the aperture stop may be obtained in advance by a simulation.

According to this embodiment, the aperture stop and the pupil modulation element 7 are moved along the optical axis O in association with the movement of the movable lens 6. Consequently, the F-number of the optical system L2 is kept unchanged regardless of changes in the focal length, and thus the spatial frequency characteristics of the optical system are also held constant. Therefore, it becomes possible to restore spatial frequency characteristics by fixed signal processing. Accordingly, it is possible to achieve a reduction in cost by simplification of the signal processing device.

It should be noted that the variable pupil modulation element 7 according to the present invention shown in FIG.

1 may be applied to the optical system shown in FIG. 8. That is, spatial frequency characteristic conversion is performed only at a specific focal length at which the depth of field is desired to enlarge, and at other focal lengths, the optical system is placed in a state where spatial frequency characteristic conversion is not performed. With this arrangement, the signal processing device can be simplified.

Figure 13A:
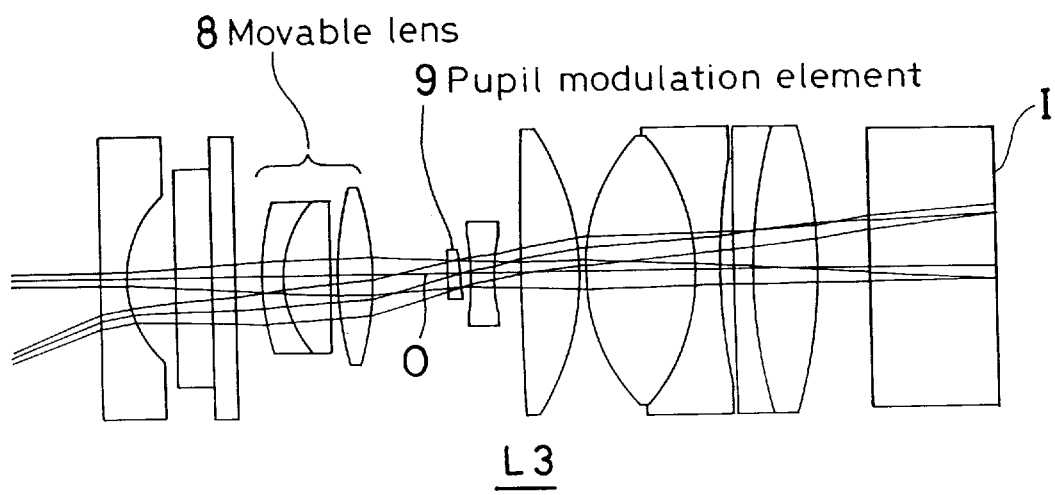
FIGS. 13a and b are sectional views showing two different states of a second embodiment of the variable-focus optical system according to the present invention.
Figure 13B:
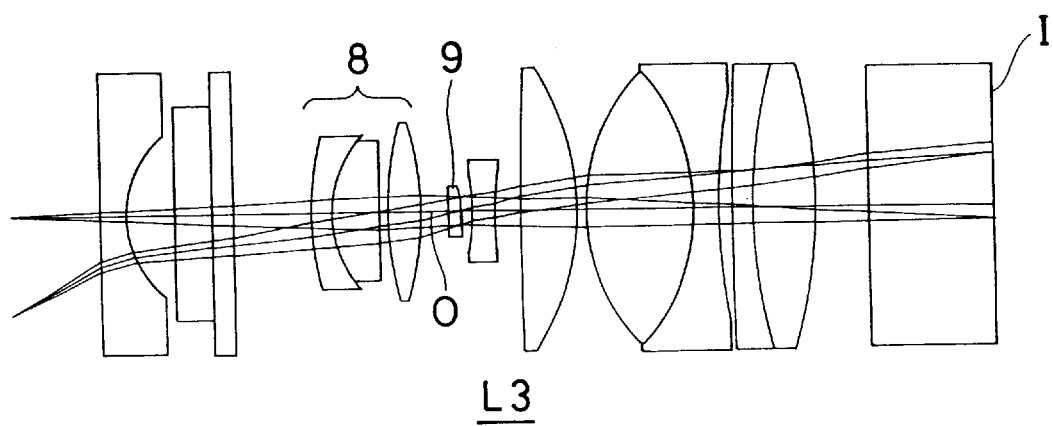

FIG. 13 shows a second embodiment of the variable-focus optical system according to the present invention. Lens data concerning a variable-focus optical system L3 according to this embodiment is shown in Table 18 (shown later).

Part (b) of FIG. 13 shows a state where a movable lens 8 situated on the object side of the aperture stop has been moved toward the image plane I along the optical axis O by 0.84 millimeters from the position shown in part (a) of FIG. 13.

In the state shown in part (a) of FIG. 13, the optical system L3 has a focal length of 2.5976 millimeters. In this state, the best subject distance is 5.75 millimeters, and F-number is 10.1699.

In the state shown in part (b) of FIG. 13, the optical system L3 has a focal length of 1.8684 millimeters. In this state, the best subject distance is 1.92 millimeters, and F-number is 10.1656.

The pupil modulation element 9 has a free-form surface on one side thereof (surface No. 12). The free-form surface has a configuration given by $z=-0.52(x^3+y^3)$.

An aperture stop is placed on the curved surface (surface No. 12) of the pupil modulation element 9. The aperture stop is a square aperture, each side of which is 0.45 millimeters long. The directions of the sides of the aperture stop are set coincident with the x- and y-axis directions of the pupil modulation element 9.

Figure 15:
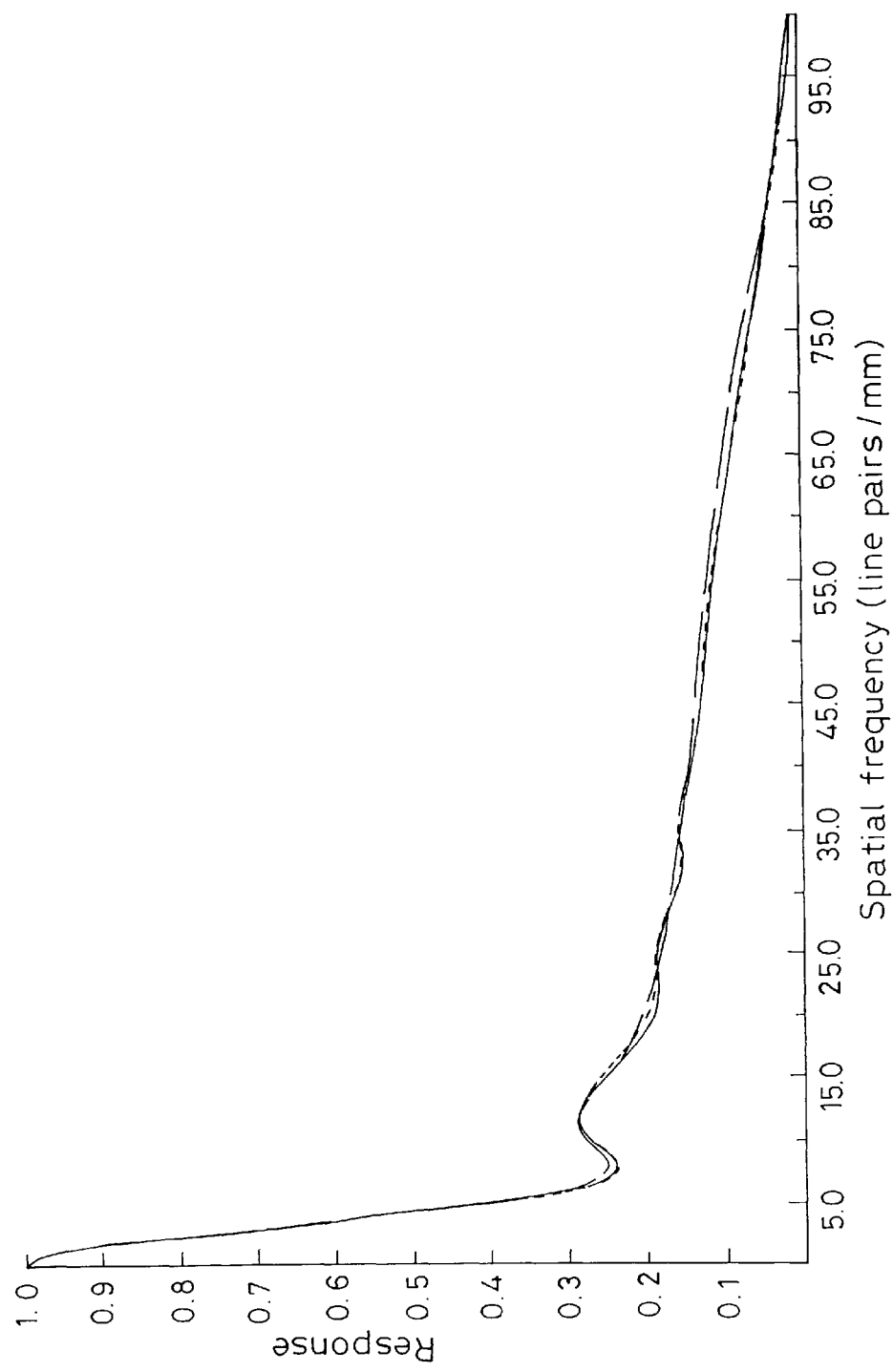
FIG. 15 is a diagram showing the spatial frequency response of the optical system in the state shown in part (b) of FIG. 13 in a case where the subject distance is 1.92 millimeters.

FIGS. 14 and 15 show the results of calculation of the spatial frequency characteristics of the optical system on the optical axis $[(x,y)=(0,0)]$ and at an image height of 1.078 millimeters $[(x,y)=(0,1.078)]$ for each of the states shown in parts (a) and (b) of FIG. 13. In FIGS. 14 and 15, curves A and B represent the spatial frequency characteristics in the y- and x-axis directions, respectively, on the optical axis, and curves C and D represent the spatial frequency characteristics in the y- and x-axis directions, respectively, at an image height of 1.078 millimeters.

FIG. 14 shows the spatial frequency response of the optical system in the state shown in part (a) of FIG. 13 in a case where the subject distance is 5.75 millimeters. Phase components in this case are shown in Table 19 (shown later).

FIG. 15 shows the spatial frequency response of the optical system in the state shown in part (b) of FIG. 13 in a case where the subject distance is 1.92 millimeters. Phase components in this case are shown in Table 20 (shown later).

It will be understood by comparing FIGS. 14 and 15 and Tables 19 and 20 that the spatial frequency characteristics of the optical system are constant regardless of the change in the focal length.

As has been stated above, the F-number of the optical system is determined by the diameter of the exit pupil and the distance from the image plane I to the exit pupil position. The exit pupil is the image of the aperture stop formed by a lens closer to the image plane I than the aperture stop. Therefore, the F-number is kept unchanged regardless of changes in the focal length of a lens situated on the object side of the aperture stop.

According to this embodiment, the F-number of the optical system L3 is kept unchanged by moving the movable lens 8 placed on the object side of the aperture stop. Thus, the F-number of the optical system L3 is unchanged regardless of changes in the focal length, and the spatial frequency characteristics of the optical system L3 are also held constant. Accordingly, it is possible to restore spatial frequency characteristics by fixed signal processing. Consequently, it is possible to achieve a reduction in cost by simplification of the signal processing device. In addition, because the aperture stop need not be moved, costs can be reduced.

Tables 1 to 20 are shown below.

TABLE 1

| Surface No. | Radius of curvature | Surface separation | Refractive index | Abbe's No. |
|---|---|---|---|---|
| 1 | ∞ | 0.4600 | 1.88300 | 40.76 |
| 2 | 1.0090 | 0.7500 | | |
| 3 | 5.9080 | 2.1200 | 1.77250 | 49.60 |
| 4 | −2.0000 | 0.0000 | | |
| 5 | ∞ | 0.2000 | 1.51633 | 64.14 |
| 6 | ∞ | 0.0300 | | |
| 7 | ∞ (Stop) | 0.0300 | | |
| 8 | ∞ | 0.2000 | 1.51633 | 64.14 |
| 9 | ∞ | 0.6100 | | |
| 10 | ∞ | 0.6200 | 1.51400 | 75.00 |
| 11 | ∞ | 0.1600 | | |
| 12 | 5.7720 | 1.3000 | 1.69680 | 55.53 |
| 13 | −1.4440 | 0.2800 | 1.84666 | 23.78 |
| 14 | −5.0200 | 0.1000 | | |
| 15 | ∞ | 0.4000 | 1.52287 | 59.90 |
| 16 | ∞ | 0.8300 | | |
| 17 | ∞ | 1.0000 | 1.51633 | 64.14 |
| 18 | ∞ | 1.2500 | 1.52287 | 59.90 |
| 19 | ∞ | | | |

TABLE 2

| | Amount of phase shift (deg) | | | |
|---|---|---|---|---|
| | on-axis (x,y) = (0,0) | | off-axis image hight (x,y) = (0,1.5) | |
| Spacial frequency (L/MM) | x<sup>−</sup> direction | y<sup>−</sup> | x<sup>−</sup> direction | y<sup>−</sup> |
| 0 | 0 | 0 | 0 | 0 |
| 5 | 52 | −51 | 55 | −56 |
| 10 | 35 | −34 | 33 | −39 |
| 15 | 44 | −43 | 50 | −56 |
| 20 | 44 | −44 | 40 | −52 |
| 25 | 34 | −32 | 41 | −53 |
| 30 | 44 | −41 | 50 | −66 |
| 35 | 41 | −42 | 41 | −59 |
| 40 | 38 | −38 | 42 | −63 |
| 45 | 44 | −42 | 52 | −76 |
| 50 | 43 | −42 | 54 | −78 |
| 55 | 47 | −47 | 52 | −82 |
| 60 | 52 | −52 | 55 | −89 |
| 65 | 49 | −47 | 61 | −98 |
| 70 | 52 | −50 | 64 | −107 |
| 75 | 61 | −61 | 73 | −114 |
| 80 | 62 | −62 | 78 | −124 |
| 85 | 73 | −72 | 85 | −134 |
| 90 | 78 | −78 | 95 | −147 |
| 95 | 86 | −85 | 104 | −162 |
| 100 | 96 | −95 | 116 | −175 |

TABLE 3

| Spacial frequency (L/MM) | Amount of phase shift (deg) | | | |
|---|---|---|---|---|
| | on-axis (x,y) = (0,0) | | off-axis image hight (x,y) = (0,1.5) | |
| | x-direction | y-direction | x-direction | y-direction |
| 0 | 0 | 0 | 0 | 0 |
| 5 | 53 | −52 | 55 | −57 |
| 10 | 40 | −39 | 36 | −39 |
| 15 | 44 | −43 | 48 | −59 |
| 20 | 47 | −46 | 45 | −50 |
| 25 | 46 | −45 | 42 | −56 |
| 30 | 44 | −43 | 48 | −64 |
| 35 | 52 | −51 | 56 | −61 |
| 40 | 48 | −47 | 47 | −73 |
| 45 | 49 | −48 | 47 | −76 |
| 50 | 54 | −53 | 58 | −78 |
| 55 | 59 | −58 | 62 | −88 |
| 60 | 59 | −58 | 59 | −94 |
| 65 | 64 | −63 | 66 | −100 |
| 70 | 68 | −68 | 72 | −109 |
| 75 | 72 | −71 | 76 | −119 |
| 80 | 82 | −81 | 85 | −130 |
| 85 | 88 | −87 | 93 | −141 |
| 90 | 95 | −95 | 102 | −152 |
| 95 | 107 | −106 | 112 | −165 |
| 100 | 113 | −112 | 121 | −178 |

TABLE 4

| Spacial frequency (L/MM) | Amount of phase shift (deg) | | | |
|---|---|---|---|---|
| | on-axis (x,y) = (0,0) | | off-axis image hight (x,y) = (0,1.5) | |
| | x-direction | y-direction | x-direction | y-direction |
| 0 | 0 | 0 | 0 | 0 |
| 5 | 51 | −50 | 55 | −57 |
| 10 | 45 | −44 | 38 | −39 |
| 15 | 37 | −36 | 45 | −59 |
| 20 | 45 | −44 | 47 | −51 |
| 25 | 50 | −49 | 42 | −56 |
| 30 | 40 | −39 | 46 | −65 |
| 35 | 40 | −39 | 54 | −61 |
| 40 | 47 | −46 | 45 | −73 |
| 45 | 51 | −50 | 48 | −78 |
| 50 | 46 | −45 | 54 | −79 |
| 55 | 48 | −47 | 57 | −89 |
| 60 | 54 | −53 | 61 | −95 |
| 65 | 58 | −57 | 67 | −102 |
| 70 | 61 | −60 | 68 | −112 |
| 75 | 69 | −68 | 76 | −121 |
| 80 | 70 | −69 | 83 | −131 |
| 85 | 80 | −79 | 89 | −141 |
| 90 | 83 | −82 | 98 | −155 |
| 95 | 93 | −92 | 108 | −170 |
| 100 | 101 | −100 | 120 | 174 |

TABLE 5

| Spacial frequency (L/MM) | Amount of phase shift (deg) | | | |
|---|---|---|---|---|
| | on-axis (x,y) = (0,0) | | off-axis image hight (x,y) = (0,1.5) | |
| | x-direction | y-direction | x-direction | y-direction |
| 0 | 0 | 0 | 0 | 0 |
| 5 | 0 | 0 | 0 | −1 |
| 10 | 0 | 0 | 0 | −2 |
| 15 | 0 | 0 | 0 | −4 |
| 20 | 0 | 0 | 0 | −5 |
| 25 | 0 | 0 | 0 | −7 |
| 30 | 0 | 0 | 0 | −9 |
| 35 | 0 | 0 | 0 | −11 |
| 40 | 0 | 0 | 0 | −13 |
| 45 | 2 | −1 | 0 | −15 |
| 50 | 180 | −179 | 0 | −17 |
| 55 | 180 | −179 | 0 | −20 |
| 60 | 180 | −179 | 1 | −22 |
| 65 | −179 | 180 | 0 | −24 |
| 70 | −179 | 180 | 2 | −27 |
| 75 | −179 | 180 | 171 | −29 |
| 80 | −179 | 180 | 179 | −32 |
| 85 | −179 | 180 | 180 | −34 |
| 90 | −179 | 180 | 180 | −37 |
| 95 | −179 | 180 | 179 | −40 |
| 100 | −179 | 180 | 180 | −43 |

TABLE 6

| Spacial frequency (L/MM) | Amount of phase shift (deg) | | | |
|---|---|---|---|---|
| | on-axis (x,y) = (0,0) | | off-axis image hight (x,y) = (0,1.5) | |
| | x-direction | y-direction | x-direction | y-direction |
| 0 | 0 | 0 | 0 | 0 |
| 5 | 0 | 0 | 0 | −1 |
| 10 | 0 | 0 | 0 | −2 |
| 15 | 0 | 0 | 0 | −4 |
| 20 | 0 | 0 | 0 | −6 |
| 25 | 0 | 0 | 0 | −8 |
| 30 | 0 | 0 | 0 | −10 |
| 35 | 0 | 0 | 0 | −12 |
| 40 | 0 | 0 | 0 | −14 |
| 45 | 0 | 0 | 0 | −15 |
| 50 | 0 | 0 | 0 | −18 |
| 55 | 0 | 0 | 0 | −20 |
| 60 | 0 | 0 | 0 | −22 |
| 65 | 0 | 0 | 0 | −24 |
| 70 | 0 | 0 | 0 | −26 |
| 75 | 0 | 0 | 0 | −28 |
| 80 | 0 | 0 | 0 | −30 |
| 85 | 0 | 0 | 0 | −33 |
| 90 | 0 | 0 | 0 | −35 |
| 95 | 0 | 0 | 0 | −38 |
| 100 | 0 | 0 | 0 | −40 |

TABLE 7

| Spacial frequency (L/MM) | Amount of phase shift (deg) | | | |
|---|---|---|---|---|
| | on-axis (x,y) = (0,0) | | off-axis image hight (x,y) = (0,1.5) | |
| | x-direction | y-direction | x-direction | y-direction |
| 0 | 0 | 0 | 0 | 0 |
| 5 | 0 | 0 | 0 | −1 |
| 10 | 0 | 0 | 0 | −3 |
| 15 | 0 | 0 | 0 | −5 |

TABLE 7-continued

| | Amount of phase shift (deg) | | | |
|---|---|---|---|---|
| | on-axis (x,y) = (0,0) | | off-axis image hight (x,y) = (0,1.5) | |
| Spacial frequency (L/MM) | x- direction | y- | x- direction | y- |
| 20 | 0 | 0 | 0 | −7 |
| 25 | 0 | 0 | 0 | −9 |
| 30 | 0 | 1 | 0 | −11 |
| 35 | 0 | 0 | 0 | −13 |
| 40 | 0 | 1 | 0 | −15 |
| 45 | −49 | 50 | 0 | −17 |
| 50 | 178 | −177 | 0 | −19 |
| 55 | 178 | −177 | 0 | −21 |
| 60 | 178 | −177 | 0 | −24 |
| 65 | 167 | −166 | 0 | −26 |
| 70 | 6 | −5 | 0 | −28 |
| 75 | 10 | −9 | 0 | −30 |
| 80 | 15 | −14 | −1 | −32 |
| 85 | 3 | −2 | 0 | −35 |
| 90 | 6 | −5 | −2 | −37 |
| 95 | 1 | 0 | 0 | −40 |
| 100 | 3 | −2 | −7 | −42 |

TABLE 8

| | Amount of phase shift (deg) | | | |
|---|---|---|---|---|
| | on-axis (x,y) = (0,0) | | off-axis image hight (x,y) = (0,1.5) | |
| Spacial frequency (L/MM) | x- direction | y- | x- direction | y- |
| 0 | 0 | 0 | 0 | 0 |
| 5 | 52 | −51 | 54 | −57 |
| 10 | 35 | −34 | 33 | −38 |
| 15 | 44 | −43 | 50 | −58 |
| 20 | 43 | −43 | 41 | −49 |
| 25 | 35 | −34 | 41 | −56 |
| 30 | 44 | −43 | 50 | −64 |
| 35 | 40 | −40 | 41 | −61 |
| 40 | 39 | −39 | 42 | −69 |
| 45 | 43 | −42 | 52 | −73 |
| 50 | 42 | −40 | 53 | −78 |
| 55 | 47 | −47 | 53 | −85 |
| 60 | 52 | −51 | 57 | −88 |
| 65 | 49 | −47 | 61 | −99 |
| 70 | 54 | −53 | 64 | −107 |
| 75 | 60 | −59 | 74 | −116 |
| 80 | 60 | −58 | 79 | −125 |
| 85 | 74 | −73 | 85 | −136 |
| 90 | 77 | −76 | 95 | −150 |
| 95 | 86 | −85 | 104 | −163 |
| 100 | 96 | −95 | 116 | −178 |

TABLE 9

| | Amount of phase shift (deg) | | | |
|---|---|---|---|---|
| | on-axis (x,y) = (0,0) | | off-axis image hight (x,y) = (0,1.5) | |
| Spacial frequency (L/MM) | x- direction | y- | x- direction | y- |
| 0 | 0 | 0 | 0 | 0 |
| 5 | 53 | −52 | 55 | −57 |
| 10 | 41 | −40 | 36 | −38 |
| 15 | 43 | −43 | 48 | −58 |
| 20 | 47 | −46 | 45 | −50 |
| 25 | 47 | −46 | 42 | −54 |

TABLE 9-continued

| | Amount of phase shift (deg) | | | |
|---|---|---|---|---|
| | on-axis (x,y) = (0,0) | | off-axis image hight (x,y) = (0,1.5) | |
| Spacial frequency (L/MM) | x- direction | y- | x- direction | y- |
| 30 | 44 | −43 | 48 | −63 |
| 35 | 52 | −50 | 55 | −68 |
| 40 | 49 | −48 | 47 | −70 |
| 45 | 49 | −48 | 47 | −71 |
| 50 | 54 | −53 | 58 | −80 |
| 55 | 58 | −57 | 62 | −89 |
| 60 | 60 | −58 | 59 | −91 |
| 65 | 64 | −63 | 66 | −100 |
| 70 | 68 | −67 | 72 | −108 |
| 75 | 72 | −71 | 76 | −120 |
| 80 | 81 | −80 | 84 | −128 |
| 85 | 87 | −86 | 92 | −139 |
| 90 | 95 | −94 | 102 | −151 |
| 95 | 106 | −105 | 112 | −165 |
| 100 | 113 | −112 | 122 | −178 |

TABLE 10

| | Amount of phase shift (deg) | | | |
|---|---|---|---|---|
| | on-axis (x,y) = (0,0) | | off-axis image hight (x,y) = (0,1.5) | |
| Spacial frequency (L/MM) | x- direction | y- | x- direction | y- |
| 0 | 0 | 0 | 0 | 0 |
| 5 | 50 | −49 | 55 | −57 |
| 10 | 45 | −44 | 38 | −38 |
| 15 | 38 | −37 | 45 | −59 |
| 20 | 44 | −43 | 47 | −50 |
| 25 | 51 | −50 | 43 | −56 |
| 30 | 39 | −38 | 45 | −62 |
| 35 | 40 | −39 | 54 | −69 |
| 40 | 47 | −46 | 46 | −69 |
| 45 | 51 | −49 | 48 | −72 |
| 50 | 46 | −45 | 54 | −82 |
| 55 | 48 | −47 | 56 | −88 |
| 60 | 53 | −52 | 61 | −92 |
| 65 | 57 | −56 | 68 | −102 |
| 70 | 61 | −60 | 67 | −110 |
| 75 | 68 | −67 | 76 | −120 |
| 80 | 70 | −69 | 83 | −128 |
| 85 | 80 | −79 | 90 | −140 |
| 90 | 83 | −82 | 98 | −154 |
| 95 | 93 | −93 | 107 | −168 |
| 100 | 100 | −99 | 119 | −177 |

TABLE 11

| | Amount of phase shift (deg) | | | |
|---|---|---|---|---|
| Spacial frequency | on-axis (x, y) = (0, 0) | | off-axis image hight (x, y) = (0, 1.5) direction | |
| (L/MM) | x- | y- | x- | y- |
| 0 | 0 | 0 | 0 | 0 |
| 5 | 1 | 0 | 1 | −1 |
| 10 | 1 | 0 | 1 | −4 |
| 15 | 2 | −1 | 2 | −6 |
| 20 | 2 | −1 | 2 | −8 |
| 25 | 2 | −1 | 2 | −10 |
| 30 | 1 | 0 | 2 | −13 |
| 35 | 0 | 1 | 2 | −15 |

TABLE 11-continued

| Spacial frequency | Amount of phase shift (deg) | | | |
|---|---|---|---|---|
| | on-axis (x, y) = (0, 0) | | off-axis image hight (x, y) = (0, 1.5) direction | |
| (L/MM) | x– | y– | x– | y– |
| 40 | –5 | 6 | 2 | –17 |
| 45 | –43 | 44 | 1 | –21 |
| 50 | –147 | 148 | 0 | –23 |
| 55 | –159 | 160 | –3 | –27 |
| 60 | –163 | 164 | –7 | –32 |
| 65 | –164 | 165 | –16 | –35 |
| 70 | –165 | 166 | –36 | –41 |
| 75 | –165 | 166 | –79 | –44 |
| 80 | –166 | 167 | –118 | –53 |
| 85 | –167 | 168 | –134 | –58 |
| 90 | –167 | 168 | –143 | –70 |
| 95 | –168 | 169 | –148 | –89 |
| 100 | –170 | 171 | –150 | –94 |

TABLE 12

| Spacial frequency | Amount of phase shift (deg) | | | |
|---|---|---|---|---|
| | on-axis (x, y) = (0, 0) | | off-axis image hight (x, y) = (0, 1.5) direction | |
| (L/MM) | x– | y– | x– | y– |
| 0 | 0 | 0 | 0 | 0 |
| 5 | 0 | 0 | 1 | –2 |
| 10 | 1 | 0 | 1 | –4 |
| 15 | 2 | –1 | 2 | –6 |
| 20 | 2 | –1 | 2 | –9 |
| 25 | 2 | –1 | 3 | –11 |
| 30 | 2 | –1 | 3 | –14 |
| 35 | 2 | –1 | 4 | –16 |
| 40 | 2 | –1 | 4 | –19 |
| 45 | 2 | –1 | 4 | –21 |
| 50 | 2 | –1 | 5 | –24 |
| 55 | 1 | 0 | 5 | –27 |
| 60 | 1 | 0 | 5 | –29 |
| 65 | 1 | 0 | 5 | –32 |
| 70 | 1 | 0 | 6 | –35 |
| 75 | 0 | 0 | 6 | –38 |
| 80 | 0 | 0 | 6 | –42 |
| 85 | 0 | 0 | 6 | –45 |
| 90 | 0 | 1 | 6 | –49 |
| 95 | 0 | 1 | 6 | –52 |
| 100 | 0 | 1 | 7 | –56 |

TABLE 13

| Spacial frequency | Amount of phase shift (deg) | | | |
|---|---|---|---|---|
| | on-axis (x, y) = (0, 0) | | off-axis image hight (x, y) = (0, 1.5) direction | |
| (L/MM) | x– | y– | x– | y– |
| 0 | 0 | 0 | 0 | 0 |
| 5 | 0 | 0 | 1 | –2 |
| 10 | 1 | 0 | 1 | –4 |
| 15 | 1 | 0 | 2 | –7 |
| 20 | 0 | 0 | 2 | –9 |
| 25 | 0 | 1 | 2 | –12 |
| 30 | –5 | 6 | 2 | –14 |
| 35 | –14 | 15 | 2 | –17 |
| 40 | –36 | 37 | 2 | –20 |
| 45 | –81 | 82 | 1 | –22 |

TABLE 13-continued

| Spacial frequency | Amount of phase shift (deg) | | | |
|---|---|---|---|---|
| | on-axis (x, y) = (0, 0) | | off-axis image hight (x, y) = (0, 1.5) direction | |
| (L/MM) | x– | y– | x– | y– |
| 50 | –107 | 108 | 0 | –25 |
| 55 | –121 | 122 | 0 | –28 |
| 60 | –116 | 117 | –2 | –30 |
| 65 | –110 | 111 | –4 | –34 |
| 70 | –59 | 60 | –8 | –36 |
| 75 | –8 | 9 | –12 | –40 |
| 80 | 3 | –2 | –19 | –43 |
| 85 | 12 | –11 | –27 | –46 |
| 90 | 20 | –19 | –38 | –50 |
| 95 | 16 | –15 | –50 | –53 |
| 100 | 20 | –19 | –66 | –57 |

TABLE 14

| Surface No. | Radius of curvature | Surface separation | Refractive index | Abbe's No. |
|---|---|---|---|---|
| 1 | ∞ | 0.5200 | 1.88300 | 40.76 |
| 2 | 1.6670 | 0.8758 | | |
| 3 | ∞ | 0.6200 | 1.51400 | 75.00 |
| 4 | ∞ | 0.0300 | | |
| 5 | ∞ | 0.4000 | 1.51633 | 64.14 |
| 6 | ∞ | 0.9026 | | |
| 7 | –6.4000 | 0.9000 | 1.84666 | 23.78 |
| 8 | 6.4000 | 0.7700 | 1.51742 | 52.43 |
| 9 | –2.6650 | 0.1515 | | |
| 10 | 4.4510 | 0.9000 | 1.51633 | 64.14 |
| 11 | –4.4510 | 0.0438 | | |
| 12 | ∞ (Stop) | 0.2000 | 1.51633 | 64.14 |
| 13 | ∞ | 1.1638 | | |
| 14 | –4.9210 | 0.3000 | 1.69680 | 55.53 |
| 15 | 2.2800 | 0.7200 | 1.80518 | 25.42 |
| 16 | 4.5180 | 3.4946 | | |
| 17 | ∞ | 1.3700 | 1.72916 | 54.68 |
| 18 | –5.3530 | 2.3792 | | |
| 19 | 5.3530 | 1.3700 | 1.72916 | 54.68 |
| 20 | ∞ | 0.3343 | | |
| 21 | –14.8440 | 0.5000 | 1.84666 | 23.78 |
| 22 | 3.5700 | 2.1000 | 1.62280 | 57.05 |
| 23 | –22.3490 | 2.3441 | | |
| 24 | ∞ | 2.6000 | 1.51633 | 64.14 |
| 25 | ∞ | 1.2500 | 1.51633 | 64.14 |

TABLE 15

| Spacial frequency | Amount of phase shift (deg) | | | |
|---|---|---|---|---|
| | on-axis (x, y) = (0, 0) | | off-axis image hight (x, y) = (0, 0.8) direction | |
| (L/MM) | x– | y– | x– | y– |
| 0 | 0 | 0 | 0 | 0 |
| 5 | 47 | –46 | 47 | –47 |
| 10 | 46 | –45 | 46 | –48 |
| 15 | 44 | –43 | 44 | –47 |
| 20 | 49 | –48 | 49 | –52 |
| 25 | 51 | –50 | 52 | –57 |
| 30 | 58 | –57 | 58 | –65 |
| 35 | 66 | –65 | 67 | –74 |
| 40 | 77 | –76 | 78 | –87 |
| 45 | 89 | –88 | 91 | –102 |
| 50 | 107 | –106 | 109 | –122 |
| 55 | 129 | –128 | 131 | –146 |
| 60 | 155 | –154 | 157 | –175 |

TABLE 15-continued

| | Amount of phase shift (deg) | | | |
|---|---|---|---|---|
| Spacial frequency | on-axis (x, y) = (0, 0) | | off-axis image hight (x, y) = (0, 0.8) direction | |
| (L/MM) | x– | y– | x– | y– |
| 65 | –175 | 176 | –172 | 151 |
| 70 | –140 | 141 | –137 | 111 |
| 75 | –100 | 101 | –97 | 66 |
| 80 | –56 | 57 | –52 | 14 |
| 85 | –6 | 7 | –1 | –43 |
| 90 | 50 | –49 | 54 | –111 |
| 95 | 114 | –113 | 119 | 169 |
| 100 | –174 | 175 | –167 | 81 |

TABLE 16

| | Amount of phase shift (deg) | | | |
|---|---|---|---|---|
| Spacial frequency | on-axis (x, y) = (0, 0) | | off-axis image hight (x, y) = (0, 0.8) direction | |
| (L/MM) | x– | y– | x– | y– |
| 0 | 0 | 0 | 0 | 0 |
| 5 | 36 | –35 | 35 | –35 |
| 10 | 45 | –44 | 45 | –45 |
| 15 | 52 | –51 | 52 | –52 |
| 20 | 52 | –51 | 52 | –50 |
| 25 | 60 | –59 | 61 | –64 |
| 30 | 75 | –74 | 74 | –73 |
| 35 | 88 | –87 | 87 | –91 |
| 40 | 108 | –107 | 110 | –116 |
| 45 | 137 | –136 | 141 | –148 |
| 50 | 174 | –173 | 178 | 173 |
| 55 | –143 | 144 | –138 | 127 |
| 60 | –93 | 94 | –87 | 71 |
| 65 | –36 | 37 | –29 | 5 |
| 70 | 31 | –30 | 37 | –71 |
| 75 | 119 | –118 | 122 | –163 |
| 80 | –142 | 143 | –128 | 75 |
| 85 | –63 | 64 | –37 | –40 |
| 90 | –130 | 131 | –110 | 168 |
| 95 | –40 | 41 | –16 | –4 |
| 100 | 127 | –126 | 137 | –169 |

TABLE 17

| | Amount of phase shift (deg) | | | |
|---|---|---|---|---|
| Spacial frequency | on-axis (x, y) = (0, 0) | | off-axis image hight (x, y) = (0, 0.8) direction | |
| (L/MM) | x– | y– | x– | y– |
| 0 | 0 | 0 | 0 | 0 |
| 5 | 51 | –50 | 51 | –53 |
| 10 | 53 | –52 | 53 | –51 |
| 15 | 42 | –41 | 43 | –42 |
| 20 | 49 | –48 | 49 | –53 |
| 25 | 54 | –53 | 54 | –53 |
| 30 | 58 | –57 | 57 | –63 |
| 35 | 67 | –66 | 68 | –70 |
| 40 | 80 | –79 | 79 | –80 |
| 45 | 90 | –89 | 90 | –97 |
| 50 | 108 | –107 | 109 | –116 |
| 55 | 131 | –130 | 133 | –137 |
| 60 | 158 | –157 | 159 | –162 |
| 65 | –171 | 172 | –169 | 166 |
| 70 | –136 | 137 | –134 | 130 |

TABLE 17-continued

| | Amount of phase shift (deg) | | | |
|---|---|---|---|---|
| Spacial frequency | on-axis (x, y) = (0, 0) | | off-axis image hight (x, y) = (0, 0.8) direction | |
| (L/MM) | x– | y– | x– | y– |
| 75 | –96 | 97 | –94 | 88 |
| 80 | –51 | 52 | –49 | 40 |
| 85 | –1 | 2 | 0 | –11 |
| 90 | 55 | –54 | 57 | –69 |
| 95 | 121 | –120 | 123 | –133 |
| 100 | –165 | 166 | –160 | 152 |

TABLE 18

| Surface No. | Radius of curvature | Surface separation | Refractive index | Abbe's No. |
|---|---|---|---|---|
| 1 | ∞ | 0.4800 | 1.88300 | 40.76 |
| 2 | 1.7990 | 0.7700 | | |
| 3 | ∞ | 0.6200 | 1.51633 | 64.14 |
| 4 | ∞ | 0.0300 | | |
| 5 | ∞ | 0.3700 | 1.51633 | 64.14 |
| 6 | ∞ | 0.4800 | | |
| 7 | 4.6000 | 0.4000 | 1.84666 | 23.78 |
| 8 | 1.9990 | 0.8000 | 1.72000 | 43.69 |
| 9 | ∞ | 0.1000 | | |
| 10 | 5.2280 | 0.5800 | 1.79952 | 42.22 |
| 11 | –5.2280 | 1.3400 | | |
| 12 | ∞ (Stop) | 0.2000 | 1.51633 | 64.14 |
| 13 | ∞ | 0.2000 | | |
| 14 | –4.3990 | 0.4000 | 1.75520 | 27.51 |
| 15 | 4.3990 | 0.4500 | | |
| 16 | 70.6760 | 1.0600 | 1.78800 | 47.37 |
| 17 | –4.2000 | 0.0998 | | |
| 18 | 3.4470 | 1.8400 | 1.65160 | 58.55 |
| 19 | –3.4470 | 0.4000 | 1.84666 | 23.78 |
| 20 | 11.1730 | 0.2075 | | |
| 21 | 62.3150 | 0.3600 | 1.88300 | 40.76 |
| 22 | 8.5940 | 1.0800 | 1.62374 | 47.05 |
| 23 | –8.5940 | 0.9000 | | |
| 24 | ∞ | 2.1000 | 1.51633 | 64.14 |

TABLE 19

| | Amount of phase shift (deg) | | | |
|---|---|---|---|---|
| Spacial frequency | on-axis (x, y) = (0, 0) | | off-axis image hight (x, y) = (0, 1.078) direction | |
| (L/MM) | x– | y– | x– | y– |
| 0 | 0 | 0 | 0 | 0 |
| 5 | 48 | –47 | 45 | –47 |
| 10 | 52 | –51 | 50 | –49 |
| 15 | 47 | –46 | 47 | –44 |
| 20 | 47 | –46 | 47 | –46 |
| 25 | 57 | –56 | 57 | –54 |
| 30 | 61 | –60 | 61 | –58 |
| 35 | 73 | –72 | 73 | –69 |
| 40 | 89 | –88 | 89 | –85 |
| 45 | 105 | –104 | 105 | –101 |
| 50 | 127 | –126 | 127 | –122 |
| 55 | 155 | –154 | 155 | –148 |
| 60 | –171 | 172 | –171 | 178 |
| 65 | –131 | 132 | –132 | 139 |
| 70 | –85 | 86 | –86 | 94 |
| 75 | –32 | 33 | –33 | 41 |
| 80 | 26 | –25 | 27 | –19 |
| 85 | 88 | –87 | 91 | –84 |
| 90 | 154 | –153 | 157 | –155 |

TABLE 19-continued

| Spacial frequency | Amount of phase shift (deg) | | | |
|---|---|---|---|---|
| | on-axis (x, y) = (0, 0) | | off-axis image hight (x, y) = (0, 1.078) direction | |
| (L/MM) | x- | y- | x- | y- |
| 95 | −118 | 119 | −124 | 85 |
| 100 | 67 | −66 | 97 | −74 |

TABLE 20

| Spacial frequency | Amount of phase shift (deg) | | | |
|---|---|---|---|---|
| | on-axis (x, y) = (0, 0) | | off-axis image hight (x, y) = (0, 1.078) direction | |
| (L/MM) | x- | y- | x- | y- |
| 0 | 0 | 0 | 0 | 0 |
| 5 | 48 | −47 | 46 | −46 |
| 10 | 52 | −51 | 49 | −49 |
| 15 | 47 | −46 | 47 | −49 |
| 20 | 47 | −46 | 47 | −49 |
| 25 | 57 | −56 | 57 | −59 |
| 30 | 61 | −60 | 61 | −64 |
| 35 | 73 | −72 | 73 | −77 |
| 40 | 89 | −88 | 89 | −90 |
| 45 | 106 | −105 | 105 | −109 |
| 50 | 127 | −126 | 127 | −133 |
| 55 | 155 | −154 | 155 | −162 |
| 60 | −171 | 172 | −170 | 164 |
| 65 | −132 | 133 | −131 | 124 |
| 70 | −86 | 87 | −86 | 79 |
| 75 | −33 | 34 | −33 | 27 |
| 80 | 25 | −24 | 25 | −31 |
| 85 | 87 | −86 | 89 | −101 |
| 90 | 154 | −153 | 157 | 177 |
| 95 | −121 | 122 | −118 | 94 |
| 100 | 61 | −60 | 81 | 0 |

As will be clear from the foregoing description, the present invention makes it possible to obtain a spatial frequency converting device in which the amount of conversion is variable, and enables depths of field to be switched over from one to another by using such a spatial frequency converting device. The variable-focus optical system according to the present invention enables observation with an enlarged depth of field by a fixed signal processing device regardless of changes in the focal length. Accordingly, it becomes possible to simplify the signal processing device and hence possible to reduce costs.

What I claim is:

1. A spatial frequency converting device constructed and arranged to convert spatial frequency characteristics of an optical system, comprising a plurality of converting units, said spatial frequency converting device being selectively actuatable to switch between a state of performing spatial frequency characteristic conversion and a state of not performing spatial frequency characteristic conversion, said plurality of converting units including two converting units, said two converting units being provided in symmetry with respect to an aperture stop, wherein said state of performing spatial frequency characteristic conversion and said state of not performing spatial frequency characteristic conversion are switched from one to the other by rotating at least one of said plurality of converting units about an optical axis.

2. An optical system comprising a spatial frequency converting unit constructed and arranged to convert spatial frequency characteristics of said optical system, said optical system being a variable-focus optical system having an aperture stop of a fixed size, wherein an F-number is invariable regardless of a change in a focal length.

3. An optical system according to claim 2, wherein a focal length of a lens or a lens unit placed on an object side of said aperture stop is changed.

4. An optical system according to claim 3, wherein the focal length of said lens or said lens unit placed on the object side of said aperture stop is changed by moving said lens or said lens unit along an optical axis.

5. An optical system according to claim 2, wherein a focal length of a lens or a lens unit placed on an image side of said aperture stop is changed, and said aperture stop and said spatial frequency converting unit are moved along an optical axis in accordance with a change in the focal length.

6. An optical system according to claim 5, wherein the focal length of the lens or the lens unit placed on the image side of said aperture stop is changed by moving said lens or said lens unit along the optical axis.

7. A spatial frequency converting device for converting spatial frequency characteristics of an optical system, said spatial frequency converting device comprising a plurality of converting units, said plurality of converting units being provided in symmetry with respect to an aperture stop of said optical system, wherein an amount of conversion of spatial frequency characteristics is variable by rotating at least one of said plurality of converting units about an optical axis.

8. A spatial frequency converting device according to claim 7, wherein changing said amount of conversion causes a change in a range of object distances in which the spatial frequency characteristics of the optical system do not substantially change regardless of a change in an object distance.

9. A spatial frequency converting device according to claim 7, which is selectively actuatable to switch between a state of performing spatial frequency characteristic conversion and a state of not performing spatial frequency characteristic conversion.

10. A spatial frequency converting device according to claim 9, wherein conversion in said state of performing spatial frequency characteristic conversion is such conversion that the spatial frequency characteristics of the optical system do not substantially change regardless of a change in an object distance over a wider range than a depth of field in said state of not performing spatial frequency characteristic conversion.

* * * * *